(12) United States Patent
Bridges et al.

(10) Patent No.: US 9,163,922 B2
(45) Date of Patent: Oct. 20, 2015

(54) COORDINATE MEASUREMENT MACHINE WITH DISTANCE METER AND CAMERA TO DETERMINE DIMENSIONS WITHIN CAMERA IMAGES

(71) Applicant: FARO Technologies, Inc., Lake Mary, FL (US)

(72) Inventors: Robert E. Bridges, Kennett Square, PA (US); David H. Parker, Earlysville, VA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/548,528

(22) Filed: Nov. 20, 2014

(65) Prior Publication Data
US 2015/0075018 A1    Mar. 19, 2015

Related U.S. Application Data

(63) Continuation-in-part of application No. 14/223,067, filed on Mar. 24, 2014, now Pat. No. 8,898,919, which is a continuation-in-part of application No. 13/524,028, filed on Jun. 15, 2012, now Pat. No.
(Continued)

(51) Int. Cl.
*G01B 5/012* (2006.01)
*G01B 21/04* (2006.01)
(Continued)

(52) U.S. Cl.
CPC .............. *G01B 5/012* (2013.01); *G01B 5/008* (2013.01); *G01B 11/002* (2013.01);
(Continued)

(58) Field of Classification Search
CPC ........ G01B 21/04; G01B 5/008; G01B 21/047
USPC ........... 33/503, 502, 504, 556, 558, 559, 1 M, 33/1 PT
See application file for complete search history.

(56) References Cited

U.S. PATENT DOCUMENTS

| 1,535,312 A | 4/1925 | Hosking |
| 1,538,758 A | 5/1925 | Taylor |

(Continued)

FOREIGN PATENT DOCUMENTS

| CN | 101024286 A | 8/2007 |
| CN | 101156043 A | 4/2008 |

(Continued)

OTHER PUBLICATIONS

Bouvet, D., et al., "Precise 3-D Localization by Automatic Laser Theodolite an Odometer for Civil-Engineering Machines", Proceedings of the 2001 IEEE International Conference on Robotics and Automation. ICRA 2001. Seoul, Korea, May 21-26, 2001; IEEE, US.
(Continued)

*Primary Examiner* — Yaritza Guadalupe-McCall
(74) *Attorney, Agent, or Firm* — Cantor Colburn LLP

(57) ABSTRACT

An articulated arm coordinate measurement machine (AACMM) that includes a noncontact 3D measurement device, position transducers, a camera, and a processor operable to project a spot of light to an object point, to measure first 3D coordinates of the object point based on readings of the noncontact 3D measurement device and the position transducers, to capture the spot of light with the camera in a camera image, and to attribute the first 3D coordinates to the spot of light in the camera image.

24 Claims, 19 Drawing Sheets

Related U.S. Application Data 8,677,643, and a continuation-in-part of application No. PCT/US2013/040321, filed on May 9, 2013.

(60) Provisional application No. 61/296,555, filed on Jan. 20, 2010, provisional application No. 61/355,279, filed on Jun. 16, 2010, provisional application No. 61/351,347, filed on Jun. 4, 2010.

(51) Int. Cl.
  *G01B 5/008* (2006.01)
  *G01B 11/00* (2006.01)
  *G05B 19/401* (2006.01)

(52) U.S. Cl.
  CPC .......... *G01B 11/005* (2013.01); *G01B 21/047* (2013.01); *G05B 19/401* (2013.01); *G01B 2210/58* (2013.01); *G05B 2219/37193* (2013.01); *G05B 2219/40233* (2013.01); *G05B 2219/40555* (2013.01); *G05B 2219/45061* (2013.01)

(56) References Cited

U.S. PATENT DOCUMENTS

| | | |
|---|---|---|
| 1,918,813 A | 7/1933 | Kinzy |
| 2,316,573 A | 4/1943 | Egy |
| 2,333,243 A | 11/1943 | Glab |
| 2,702,683 A | 2/1955 | Green et al. |
| 2,748,926 A | 6/1956 | Leahy |
| 2,983,367 A | 6/1958 | Paramater et al. |
| 2,924,495 A | 9/1958 | Haines |
| 2,966,257 A | 12/1960 | Littlejohn |
| 3,066,790 A | 12/1962 | Armbruster |
| 3,447,852 A | 6/1969 | Barlow |
| 3,458,167 A | 7/1969 | Cooley, Jr. |
| 3,830,567 A | 8/1974 | Riegl |
| 3,899,145 A | 8/1975 | Stephenson |
| 3,945,729 A | 3/1976 | Rosen |
| 4,138,045 A | 2/1979 | Baker |
| 4,178,515 A | 12/1979 | Tarasevich |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,561,776 A | 12/1985 | Pryor |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,667,231 A | 5/1987 | Pryor |
| 4,676,002 A | 6/1987 | Slocum |
| 4,714,339 A | 12/1987 | Lau et al. |
| 4,733,961 A | 3/1988 | Mooney |
| 4,736,218 A | 4/1988 | Kutman |
| 4,751,950 A | 6/1988 | Bock |
| 4,767,257 A | 8/1988 | Kato |
| 4,790,651 A | 12/1988 | Brown et al. |
| 4,816,822 A | 3/1989 | Vache et al. |
| 4,870,274 A | 9/1989 | Hebert et al. |
| 4,882,806 A | 11/1989 | Davis |
| 4,891,509 A | 1/1990 | Jones et al. |
| 4,954,952 A | 9/1990 | Ubhayakar et al. |
| 4,982,841 A | 1/1991 | Goedecke |
| 4,984,881 A | 1/1991 | Osada et al. |
| 4,996,909 A | 3/1991 | Vache et al. |
| 4,999,491 A | 3/1991 | Semler et al. |
| 5,021,641 A | 6/1991 | Swartz et al. |
| 5,025,966 A | 6/1991 | Potter |
| 5,027,951 A | 7/1991 | Johnson |
| 5,068,971 A | 12/1991 | Simon |
| 5,069,524 A | 12/1991 | Watanabe et al. |
| 5,155,684 A | 10/1992 | Burke et al. |
| 5,168,532 A | 12/1992 | Seppi et al. |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,216,479 A | 6/1993 | Dotan et al. |
| 5,218,427 A | 6/1993 | Koch |
| 5,219,423 A | 6/1993 | Kamaya |
| 5,239,855 A | 8/1993 | Schleifer et al. |
| 5,289,265 A | 2/1994 | Inoue et al. |
| 5,289,855 A | 3/1994 | Baker et al. |
| 5,313,261 A | 5/1994 | Leatham et al. |
| 5,319,445 A | 6/1994 | Fitts |
| 5,329,347 A | 7/1994 | Wallace et al. |
| 5,329,467 A | 7/1994 | Nagamune et al. |
| 5,332,315 A | 7/1994 | Baker et al. |
| 5,371,347 A | 12/1994 | Plesko |
| 5,372,250 A | 12/1994 | Johnson |
| 5,373,346 A | 12/1994 | Hocker |
| 5,402,365 A | 3/1995 | Kozikaro et al. |
| 5,402,582 A | 4/1995 | Raab |
| 5,412,880 A | 5/1995 | Raab |
| 5,416,505 A | 5/1995 | Eguchi et al. |
| 5,430,384 A | 7/1995 | Hocker |
| 5,446,846 A | 8/1995 | Lennartsson |
| 5,455,670 A | 10/1995 | Payne et al. |
| 5,455,993 A | 10/1995 | Link et al. |
| 5,510,977 A | 4/1996 | Raab |
| 5,517,297 A | 5/1996 | Stenton |
| 5,528,354 A | 6/1996 | Uwira |
| 5,528,505 A | 6/1996 | Granger et al. |
| 5,535,524 A | 7/1996 | Carrier et al. |
| 5,611,147 A | 3/1997 | Raab |
| 5,615,489 A | 4/1997 | Breyer et al. |
| 5,623,416 A | 4/1997 | Hocker, III |
| 5,629,756 A | 5/1997 | Kitajima |
| 5,668,631 A | 9/1997 | Norita et al. |
| 5,675,326 A | 10/1997 | Juds et al. |
| 5,677,760 A | 10/1997 | Mikami et al. |
| 5,682,508 A | 10/1997 | Hocker, III |
| 5,716,036 A | 2/1998 | Isobe et al. |
| 5,724,264 A | 3/1998 | Rosenberg et al. |
| 5,734,417 A | 3/1998 | Yamamoto et al. |
| 5,745,225 A | 4/1998 | Watanabe et al. |
| 5,752,112 A | 5/1998 | Paddock et al. |
| 5,754,449 A | 5/1998 | Hoshal et al. |
| 5,768,792 A | 6/1998 | Raab |
| 5,793,993 A | 8/1998 | Broedner et al. |
| 5,804,805 A | 9/1998 | Koenck et al. |
| 5,825,666 A | 10/1998 | Freifeld |
| 5,829,148 A | 11/1998 | Eaton |
| 5,831,719 A | 11/1998 | Berg et al. |
| 5,832,416 A | 11/1998 | Anderson |
| 5,844,591 A | 12/1998 | Takamatsu et al. |
| 5,856,874 A | 1/1999 | Tachibana et al. |
| 5,887,122 A | 3/1999 | Terawaki et al. |
| 5,894,123 A | 4/1999 | Ohtomo et al. |
| 5,898,484 A | 4/1999 | Harris |
| 5,898,490 A | 4/1999 | Ohtomo et al. |
| 5,909,939 A | 6/1999 | Fugmann |
| 5,926,782 A | 7/1999 | Raab |
| 5,933,267 A | 8/1999 | Ishizuka |
| 5,936,721 A | 8/1999 | Ohtomo et al. |
| 5,940,170 A | 8/1999 | Berg et al. |
| 5,940,181 A | 8/1999 | Tsubono et al. |
| 5,949,530 A | 9/1999 | Wetteborn |
| 5,956,857 A | 9/1999 | Raab |
| 5,969,321 A | 10/1999 | Danielson et al. |
| 5,973,788 A | 10/1999 | Pettersen et al. |
| 5,978,748 A | 11/1999 | Raab |
| 5,983,936 A | 11/1999 | Schwieterman et al. |
| 5,988,862 A | 11/1999 | Kacyra et al. |
| 5,991,011 A | 11/1999 | Damm |
| 5,996,790 A | 12/1999 | Yamada et al. |
| 5,997,779 A | 12/1999 | Potter |
| 6,040,898 A | 3/2000 | Mrosik et al. |
| D423,534 S | 4/2000 | Raab et al. |
| 6,050,615 A | 4/2000 | Weinhold |

(56) References Cited

U.S. PATENT DOCUMENTS

| | | |
|---|---|---|
| 6,057,915 A | 5/2000 | Squire et al. |
| 6,060,889 A | 5/2000 | Hocker |
| 6,067,116 A | 5/2000 | Yamano et al. |
| 6,069,700 A | 5/2000 | Rudnick et al. |
| 6,077,306 A | 6/2000 | Metzger et al. |
| 6,112,423 A | 9/2000 | Sheehan |
| 6,115,511 A | 9/2000 | Sakai et al. |
| 6,125,337 A | 9/2000 | Rosenberg et al. |
| 6,131,299 A | 10/2000 | Raab et al. |
| 6,134,507 A | 10/2000 | Markey, Jr. et al. |
| 6,138,915 A | 10/2000 | Danielson et al. |
| 6,149,112 A | 11/2000 | Thieltges |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,204,651 B1 | 3/2001 | Marcus et al. |
| 6,204,961 B1 | 3/2001 | Anderson et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,285,390 B1 | 9/2001 | Blake |
| 6,298,569 B1 | 10/2001 | Raab et al. |
| 6,339,410 B1 | 1/2002 | Milner et al. |
| 6,349,249 B1 | 2/2002 | Cunningham |
| 6,366,831 B1 | 4/2002 | Raab |
| 6,408,252 B1 | 6/2002 | De Smet |
| 6,418,774 B1 | 7/2002 | Brogaardh et al. |
| 6,438,507 B1 | 8/2002 | Imai |
| 6,438,856 B1 | 8/2002 | Kaczynski |
| 6,442,419 B1 | 8/2002 | Chu et al. |
| 6,445,446 B1 | 9/2002 | Kumagai et al. |
| 6,460,004 B2 | 10/2002 | Greer et al. |
| 6,470,584 B1 | 10/2002 | Stoodley |
| 6,477,784 B2 | 11/2002 | Schroeder et al. |
| 6,480,270 B1 | 11/2002 | Studnicka et al. |
| 6,483,106 B1 | 11/2002 | Ohtomo et al. |
| 6,497,394 B1 | 12/2002 | Dunchock |
| 6,504,602 B1 | 1/2003 | Hinderling |
| 6,512,575 B1 | 1/2003 | Marchi |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| D479,544 S | 9/2003 | Raab et al. |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,649,208 B2 | 11/2003 | Rodgers |
| 6,650,402 B2 | 11/2003 | Sullivan et al. |
| 6,668,466 B1 | 12/2003 | Bieg et al. |
| 6,675,122 B1 | 1/2004 | Markendorf et al. |
| 6,681,495 B2 | 1/2004 | Masayuki et al. |
| 6,710,859 B2 | 3/2004 | Shirai et al. |
| D490,831 S | 6/2004 | Raab et al. |
| D491,210 S | 6/2004 | Raab et al. |
| 6,750,873 B1 | 6/2004 | Bernardini et al. |
| 6,753,876 B2 | 6/2004 | Brooksby et al. |
| 6,759,649 B2 | 7/2004 | Hipp |
| 6,759,979 B2 | 7/2004 | Vashisth et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,825,923 B2 | 11/2004 | Hamar et al. |
| 6,826,664 B2 | 11/2004 | Hocker, III et al. |
| 6,847,436 B2 | 1/2005 | Bridges |
| 6,856,381 B2 | 2/2005 | Christoph |
| 6,858,836 B1 | 2/2005 | Hartrumpf |
| 6,859,269 B2 | 2/2005 | Ohtomo et al. |
| 6,862,097 B2 | 3/2005 | Yanagisawa et al. |
| 6,868,359 B2 | 3/2005 | Raab |
| 6,879,933 B2 | 4/2005 | Steffey et al. |
| 6,889,903 B1 | 5/2005 | Koenck |
| 6,892,465 B2 | 5/2005 | Raab et al. |
| 6,894,767 B2 | 5/2005 | Ishinabe et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,914,678 B1 | 7/2005 | Ulrichsen et al. |
| 6,917,415 B2 | 7/2005 | Gogolla et al. |
| 6,920,697 B2 | 7/2005 | Raab et al. |
| 6,925,722 B2 | 8/2005 | Raab et al. |
| 6,931,745 B2 | 8/2005 | Granger |
| 6,935,036 B2 | 8/2005 | Raab et al. |
| 6,935,748 B2 | 8/2005 | Kaufman et al. |
| 6,948,255 B2 | 9/2005 | Russell |
| 6,957,496 B2 | 10/2005 | Raab et al. |
| 6,965,843 B2 | 11/2005 | Raab et al. |
| 6,973,734 B2 | 12/2005 | Raab et al. |
| 6,988,322 B2 | 1/2006 | Raab et al. |
| 6,989,890 B2 | 1/2006 | Riegl et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,029,126 B2 | 4/2006 | Tang |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,069,124 B1 | 6/2006 | Whittaker et al. |
| 7,076,420 B1 | 7/2006 | Snyder et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,127,822 B2 | 10/2006 | Kumagai et al. |
| 7,136,153 B2 | 11/2006 | Mori et al. |
| 7,140,213 B2 | 11/2006 | Feucht et al. |
| 7,142,289 B2 | 11/2006 | Ando et al. |
| 7,145,926 B2 | 12/2006 | Vitruk et al. |
| 7,152,456 B2 | 12/2006 | Eaton |
| 7,174,651 B2 | 2/2007 | Raab et al. |
| 7,180,072 B2 | 2/2007 | Persi et al. |
| 7,184,047 B1 | 2/2007 | Crampton |
| 7,190,465 B2 | 3/2007 | Froehlich et al. |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,200,246 B2 | 4/2007 | Cofer et al. |
| 7,202,941 B2 | 4/2007 | Munro |
| 7,230,689 B2 | 6/2007 | Lau |
| 7,242,590 B1 | 7/2007 | Yeap et al. |
| 7,246,030 B2 | 7/2007 | Raab et al. |
| 7,249,421 B2 | 7/2007 | MacManus et al. |
| 7,256,899 B1 | 8/2007 | Faul et al. |
| 7,269,910 B2 | 9/2007 | Raab et al. |
| D551,943 S | 10/2007 | Hodjat et al. |
| 7,285,793 B2 | 10/2007 | Husted |
| 7,296,364 B2 | 11/2007 | Seitz et al. |
| 7,296,955 B2 | 11/2007 | Dreier |
| 7,296,979 B2 | 11/2007 | Raab et al. |
| 7,306,339 B2 | 12/2007 | Kaufman et al. |
| 7,307,701 B2 | 12/2007 | Hoffman, II |
| 7,312,862 B2 | 12/2007 | Zumbrunn et al. |
| 7,313,264 B2 | 12/2007 | Crampton |
| D559,657 S | 1/2008 | Wohlford et al. |
| 7,319,512 B2 | 1/2008 | Ohtomo et al. |
| 7,330,242 B2 | 2/2008 | Reichert et al. |
| 7,337,344 B2 | 2/2008 | Barman et al. |
| 7,342,650 B2 | 3/2008 | Kern et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |

(56) References Cited

U.S. PATENT DOCUMENTS

| | | |
|---|---|---|
| 7,395,606 B2 | 7/2008 | Crampton |
| 7,400,384 B1 | 7/2008 | Evans et al. |
| 7,403,269 B2 | 7/2008 | Yamashita et al. |
| 7,430,068 B2 | 9/2008 | Becker et al. |
| 7,430,070 B2 | 9/2008 | Soreide et al. |
| 7,441,341 B2 | 10/2008 | Eaton |
| 7,443,555 B2 | 10/2008 | Blug et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,477,359 B2 | 1/2009 | England et al. |
| 7,480,037 B2 | 1/2009 | Palmateer et al. |
| 7,508,496 B2 | 3/2009 | Mettenleiter et al. |
| 7,508,971 B2 | 3/2009 | Vaccaro et al. |
| 7,515,256 B2 | 4/2009 | Ohtomo et al. |
| 7,525,276 B2 | 4/2009 | Eaton |
| 7,527,205 B2 | 5/2009 | Zhu et al. |
| 7,528,768 B2 | 5/2009 | Wakayama et al. |
| 7,541,830 B2 | 6/2009 | Fahrbach et al. |
| 7,545,517 B2 | 6/2009 | Rueb et al. |
| 7,546,689 B2 | 6/2009 | Ferrari et al. |
| 7,551,771 B2 | 6/2009 | England, III |
| 7,552,644 B2 | 6/2009 | Haase et al. |
| 7,557,824 B2 | 7/2009 | Holliman |
| 7,561,598 B2 | 7/2009 | Stratton et al. |
| 7,564,250 B2 | 7/2009 | Hocker |
| 7,568,293 B2 | 8/2009 | Ferrari |
| 7,578,069 B2 | 8/2009 | Eaton |
| D599,226 S | 9/2009 | Gerent et al. |
| 7,589,595 B2 | 9/2009 | Cutler |
| 7,589,825 B2 | 9/2009 | Orchard et al. |
| 7,591,077 B2 | 9/2009 | Pettersson |
| 7,591,078 B2 | 9/2009 | Crampton |
| 7,599,106 B2 | 10/2009 | Matsumoto et al. |
| 7,600,061 B2 | 10/2009 | Honda |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| 7,626,690 B2 | 12/2009 | Kumagai et al. |
| D607,350 S | 1/2010 | Cooduvalli et al. |
| 7,656,751 B2 | 2/2010 | Rischar et al. |
| 7,659,995 B2 | 2/2010 | Knighton et al. |
| D610,926 S | 3/2010 | Gerent et al. |
| 7,693,325 B2 | 4/2010 | Pulla et al. |
| 7,697,748 B2 | 4/2010 | Dimsdale et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,728,833 B2 | 6/2010 | Verma et al. |
| 7,728,963 B2 | 6/2010 | Kirschner |
| 7,733,544 B2 | 6/2010 | Becker et al. |
| 7,735,234 B2 | 6/2010 | Briggs et al. |
| 7,743,524 B2 | 6/2010 | Eaton et al. |
| 7,752,003 B2 | 7/2010 | MacManus |
| 7,756,615 B2 | 7/2010 | Barfoot et al. |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,784,194 B2 | 8/2010 | Raab et al. |
| 7,787,670 B2 | 8/2010 | Urushiya |
| 7,793,425 B2 | 9/2010 | Bailey |
| 7,798,453 B2 | 9/2010 | Maningo et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| 7,834,985 B2 | 11/2010 | Morcom |
| 7,847,922 B2 | 12/2010 | Gittinger et al. |
| RE42,055 E | 1/2011 | Raab |
| 7,869,005 B2 | 1/2011 | Ossig et al. |
| RE42,082 E | 2/2011 | Raab et al. |
| 7,881,896 B2 | 2/2011 | Atwell et al. |
| 7,889,324 B2 | 2/2011 | Yamamoto |
| 7,891,248 B2 | 2/2011 | Hough et al. |
| 7,900,714 B2 | 3/2011 | Milbourne et al. |
| 7,903,245 B2 | 3/2011 | Miousset et al. |
| 7,903,261 B2 | 3/2011 | Saint Clair et al. |
| 7,908,757 B2 | 3/2011 | Ferrari |
| 7,933,055 B2 | 4/2011 | Jensen et al. |
| 7,935,928 B2 | 5/2011 | Seger et al. |
| 7,965,747 B2 | 6/2011 | Kumano |
| 7,982,866 B2 | 7/2011 | Vogel |
| D643,319 S | 8/2011 | Ferrari et al. |
| 7,990,397 B2 | 8/2011 | Bukowski et al. |
| 7,994,465 B1 | 8/2011 | Bamji et al. |
| 7,995,834 B1 | 8/2011 | Knighton et al. |
| 8,001,697 B2 | 8/2011 | Danielson et al. |
| 8,020,657 B2 | 9/2011 | Allard et al. |
| 8,022,812 B2 | 9/2011 | Beniyama et al. |
| 8,028,432 B2 | 10/2011 | Bailey et al. |
| 8,036,775 B2 | 10/2011 | Matsumoto et al. |
| 8,045,762 B2 | 10/2011 | Otani et al. |
| 8,051,710 B2 | 11/2011 | Van Dam et al. |
| 8,052,857 B2 | 11/2011 | Townsend |
| 8,064,046 B2 | 11/2011 | Ossig et al. |
| 8,065,861 B2 | 11/2011 | Caputo |
| 8,082,673 B2 | 12/2011 | Desforges et al. |
| 8,099,877 B2 | 1/2012 | Champ |
| 8,117,668 B2 | 2/2012 | Crampton et al. |
| 8,123,350 B2 | 2/2012 | Cannell et al. |
| 8,152,071 B2 | 4/2012 | Doherty et al. |
| D659,035 S | 5/2012 | Ferrari et al. |
| 8,171,650 B2 | 5/2012 | York et al. |
| 8,179,936 B2 | 5/2012 | Bueche et al. |
| D662,427 S | 6/2012 | Bailey et al. |
| 8,218,131 B2 | 7/2012 | Otani et al. |
| 8,224,032 B2 | 7/2012 | Fuchs et al. |
| 8,260,483 B2 | 9/2012 | Barfoot et al. |
| 8,269,984 B2 | 9/2012 | Hinderling et al. |
| 8,276,286 B2 | 10/2012 | Bailey et al. |
| 8,284,407 B2 | 10/2012 | Briggs et al. |
| 8,310,653 B2 | 11/2012 | Ogawa et al. |
| 8,321,612 B2 | 11/2012 | Hartwich et al. |
| 8,346,392 B2 | 1/2013 | Walser et al. |
| 8,346,480 B2 | 1/2013 | Trepagnier et al. |
| 8,352,212 B2 | 1/2013 | Fetter et al. |
| 8,353,059 B2 | 1/2013 | Crampton et al. |
| D676,341 S | 2/2013 | Bailey et al. |
| 8,379,191 B2 | 2/2013 | Braunecker et al. |
| 8,381,704 B2 | 2/2013 | Debelak et al. |
| 8,384,914 B2 | 2/2013 | Becker et al. |
| D678,085 S | 3/2013 | Bailey et al. |
| 8,391,565 B2 | 3/2013 | Purcell et al. |
| 8,402,669 B2 | 3/2013 | Ferrari et al. |
| 8,422,035 B2 | 4/2013 | Hinderling et al. |
| 8,497,901 B2 | 7/2013 | Pettersson |
| 8,533,967 B2 | 9/2013 | Bailey et al. |
| 8,537,374 B2 | 9/2013 | Briggs et al. |
| 8,619,265 B2 | 12/2013 | Steffey et al. |
| 8,645,022 B2 | 2/2014 | Yoshimura et al. |
| 8,659,748 B2 | 2/2014 | Dakin et al. |
| 8,659,752 B2 | 2/2014 | Cramer et al. |
| 8,661,700 B2 | 3/2014 | Briggs et al. |
| 8,677,643 B2 | 3/2014 | Bridges et al. |
| 8,683,709 B2 | 4/2014 | York |
| 8,699,007 B2 | 4/2014 | Becker et al. |
| 8,705,012 B2 | 4/2014 | Greiner et al. |
| 8,705,016 B2 | 4/2014 | Schumann et al. |
| 8,718,837 B2 | 5/2014 | Wang et al. |
| 8,784,425 B2 | 7/2014 | Ritchey et al. |
| 8,797,552 B2 | 8/2014 | Suzuki et al. |
| 8,830,485 B2 | 9/2014 | Woloschyn |
| 2001/0004269 A1 | 6/2001 | Shibata et al. |
| 2002/0032541 A1 | 3/2002 | Raab et al. |
| 2002/0059042 A1 | 5/2002 | Kacyra et al. |
| 2002/0087233 A1 | 7/2002 | Raab |
| 2002/0128790 A1 | 9/2002 | Woodmansee |

(56) References Cited

U.S. PATENT DOCUMENTS

| | | |
|---|---|---|
| 2002/0143506 A1 | 10/2002 | D'Aligny et al. |
| 2002/0149694 A1 | 10/2002 | Seo |
| 2002/0170192 A1 | 11/2002 | Steffey et al. |
| 2002/0176097 A1 | 11/2002 | Rodgers |
| 2003/0002055 A1 | 1/2003 | Kilthau et al. |
| 2003/0033104 A1 | 2/2003 | Gooche |
| 2003/0043386 A1 | 3/2003 | Froehlich et al. |
| 2003/0053037 A1 | 3/2003 | Blaesing-Bangert et al. |
| 2003/0066954 A1 | 4/2003 | Hipp |
| 2003/0090646 A1 | 5/2003 | Riegl et al. |
| 2003/0125901 A1 | 7/2003 | Steffey et al. |
| 2003/0137449 A1 | 7/2003 | Vashisth et al. |
| 2003/0142631 A1 | 7/2003 | Silvester |
| 2003/0172536 A1 | 9/2003 | Raab et al. |
| 2003/0172537 A1 | 9/2003 | Raab et al. |
| 2003/0179361 A1 | 9/2003 | Ohtomo et al. |
| 2003/0208919 A1 | 11/2003 | Raab et al. |
| 2004/0004727 A1 | 1/2004 | Yanagisawa et al. |
| 2004/0022416 A1 | 2/2004 | Lemelson et al. |
| 2004/0027554 A1 | 2/2004 | Ishinabe et al. |
| 2004/0040166 A1 | 3/2004 | Raab et al. |
| 2004/0135990 A1 | 7/2004 | Ohtomo et al. |
| 2004/0139265 A1 | 7/2004 | Hocker, III et al. |
| 2004/0158355 A1 | 8/2004 | Holmqvist et al. |
| 2004/0162700 A1 | 8/2004 | Rosenberg et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2004/0259533 A1 | 12/2004 | Nixon et al. |
| 2005/0024625 A1 | 2/2005 | Mori et al. |
| 2005/0028393 A1 | 2/2005 | Raab et al. |
| 2005/0046823 A1 | 3/2005 | Ando et al. |
| 2005/0058332 A1 | 3/2005 | Kaufman et al. |
| 2005/0082262 A1 | 4/2005 | Rueb et al. |
| 2005/0085940 A1 | 4/2005 | Griggs et al. |
| 2005/0111514 A1 | 5/2005 | Matsumoto et al. |
| 2005/0141052 A1 | 6/2005 | Becker et al. |
| 2005/0144799 A1 | 7/2005 | Raab et al. |
| 2005/0150123 A1 | 7/2005 | Eaton |
| 2005/0151963 A1 | 7/2005 | Pulla et al. |
| 2005/0166413 A1 | 8/2005 | Crampton |
| 2005/0172503 A1 | 8/2005 | Kumagai et al. |
| 2005/0188557 A1 | 9/2005 | Raab et al. |
| 2005/0190384 A1 | 9/2005 | Persi et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0061566 A1 | 3/2006 | Verma et al. |
| 2006/0088044 A1 | 4/2006 | Hammerl et al. |
| 2006/0096108 A1 | 5/2006 | Raab et al. |
| 2006/0103853 A1 | 5/2006 | Palmateer |
| 2006/0109536 A1 | 5/2006 | Mettenleiter et al. |
| 2006/0123649 A1 | 6/2006 | Muller |
| 2006/0129349 A1 | 6/2006 | Raab et al. |
| 2006/0132803 A1 | 6/2006 | Clair et al. |
| 2006/0145703 A1 | 7/2006 | Steinbichler et al. |
| 2006/0169050 A1 | 8/2006 | Kobayashi et al. |
| 2006/0169608 A1 | 8/2006 | Carnevali et al. |
| 2006/0170870 A1 | 8/2006 | Kaufman et al. |
| 2006/0186301 A1 | 8/2006 | Dozier et al. |
| 2006/0193521 A1 | 8/2006 | England, III et al. |
| 2006/0241791 A1 | 10/2006 | Pokorny et al. |
| 2006/0245717 A1 | 11/2006 | Ossig et al. |
| 2006/0279246 A1 | 12/2006 | Hashimoto et al. |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0019212 A1 | 1/2007 | Gatsios et al. |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058154 A1 | 3/2007 | Reichert et al. |
| 2007/0058162 A1 | 3/2007 | Granger |
| 2007/0064976 A1 | 3/2007 | England, III |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson et al. |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton et al. |
| 2007/0171394 A1 | 7/2007 | Steiner et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0221522 A1 | 9/2007 | Yamada et al. |
| 2007/0223477 A1 | 9/2007 | Eidson |
| 2007/0229929 A1 | 10/2007 | Soreide et al. |
| 2007/0247615 A1 | 10/2007 | Bridges et al. |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott et al. |
| 2008/0068103 A1 | 3/2008 | Cutler |
| 2008/0075325 A1 | 3/2008 | Otani et al. |
| 2008/0075326 A1 | 3/2008 | Otani et al. |
| 2008/0080562 A1 | 4/2008 | Burch et al. |
| 2008/0098272 A1 | 4/2008 | Fairbanks et al. |
| 2008/0148585 A1 | 6/2008 | Raab et al. |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0273758 A1 | 11/2008 | Fuchs et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0010740 A1 | 1/2009 | Ferrari et al. |
| 2009/0013548 A1 | 1/2009 | Ferrari |
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046752 A1 | 2/2009 | Bueche et al. |

(56) References Cited

U.S. PATENT DOCUMENTS

| | | |
|---|---|---|
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey et al. |
| 2009/0133494 A1 | 5/2009 | Van Dam et al. |
| 2009/0139105 A1 | 6/2009 | Granger |
| 2009/0157419 A1 | 6/2009 | Bursey |
| 2009/0161091 A1 | 6/2009 | Yamamoto |
| 2009/0165317 A1 | 7/2009 | Little |
| 2009/0177435 A1 | 7/2009 | Heininen |
| 2009/0177438 A1 | 7/2009 | Raab |
| 2009/0185741 A1 | 7/2009 | Nahari et al. |
| 2009/0187373 A1 | 7/2009 | Atwell |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0273771 A1 | 11/2009 | Gittinger et al. |
| 2009/0299689 A1 | 12/2009 | Stubben et al. |
| 2009/0322859 A1 | 12/2009 | Shelton et al. |
| 2009/0323121 A1 | 12/2009 | Valkenburg et al. |
| 2009/0323742 A1 | 12/2009 | Kumano |
| 2010/0030421 A1 | 2/2010 | Yoshimura et al. |
| 2010/0040742 A1 | 2/2010 | Dijkhuis et al. |
| 2010/0049891 A1 | 2/2010 | Hartwich et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0134596 A1 | 6/2010 | Becker |
| 2010/0135534 A1 | 6/2010 | Weston et al. |
| 2010/0148013 A1 | 6/2010 | Bhotika et al. |
| 2010/0188504 A1 | 7/2010 | Dimsdale et al. |
| 2010/0195086 A1 | 8/2010 | Ossig et al. |
| 2010/0207938 A1 | 8/2010 | Yau et al. |
| 2010/0208062 A1 | 8/2010 | Pettersson |
| 2010/0208318 A1 | 8/2010 | Jensen et al. |
| 2010/0245851 A1 | 9/2010 | Teodorescu |
| 2010/0277472 A1 | 11/2010 | Kaltenbach et al. |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0000095 A1 | 1/2011 | Carlson |
| 2011/0001958 A1 | 1/2011 | Bridges et al. |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0025905 A1 | 2/2011 | Tanaka |
| 2011/0043515 A1 | 2/2011 | Stathis |
| 2011/0066781 A1 | 3/2011 | Debelak et al. |
| 2011/0094908 A1 | 4/2011 | Trieu et al. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0123097 A1 | 5/2011 | Van Coppenolle et al. |
| 2011/0164114 A1 | 7/2011 | Kobayashi et al. |
| 2011/0169924 A1 | 7/2011 | Haisty et al. |
| 2011/0173823 A1 | 7/2011 | Bailey et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1 | 7/2011 | Atwell et al. |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari et al. |
| 2011/0273568 A1 | 11/2011 | Lagassey et al. |
| 2011/0282622 A1 | 11/2011 | Canter et al. |
| 2011/0288684 A1 | 11/2011 | Farlow et al. |
| 2012/0019806 A1 | 1/2012 | Becker et al. |
| 2012/0035788 A1 | 2/2012 | Trepagnier et al. |
| 2012/0035798 A1 | 2/2012 | Barfoot et al. |
| 2012/0044476 A1 | 2/2012 | Earhart et al. |
| 2012/0046820 A1 | 2/2012 | Allard et al. |
| 2012/0069325 A1 | 3/2012 | Schumann et al. |
| 2012/0069352 A1 | 3/2012 | Ossig et al. |
| 2012/0070077 A1 | 3/2012 | Ossig et al. |
| 2012/0113913 A1 | 5/2012 | Tiirola et al. |
| 2012/0140244 A1 | 6/2012 | Gittinger et al. |
| 2012/0154786 A1 | 6/2012 | Gosch et al. |
| 2012/0155744 A1 | 6/2012 | Kennedy et al. |
| 2012/0169876 A1 | 7/2012 | Reichert et al. |
| 2012/0181194 A1 | 7/2012 | McEwan et al. |
| 2012/0197439 A1 | 8/2012 | Wang et al. |
| 2012/0210678 A1 | 8/2012 | Alcouloumre et al. |
| 2012/0217357 A1 | 8/2012 | Franke |
| 2012/0229788 A1 | 9/2012 | Schumann et al. |
| 2012/0260512 A1 | 10/2012 | Kretschmer et al. |
| 2012/0260611 A1 | 10/2012 | Jones et al. |
| 2012/0262700 A1 | 10/2012 | Schumann et al. |
| 2012/0287265 A1 | 11/2012 | Schumann et al. |
| 2013/0010307 A1 | 1/2013 | Greiner et al. |
| 2013/0025143 A1 | 1/2013 | Bailey et al. |
| 2013/0025144 A1 | 1/2013 | Briggs et al. |
| 2013/0027515 A1 | 1/2013 | Vinther et al. |
| 2013/0062243 A1 | 3/2013 | Chang et al. |
| 2013/0070250 A1 | 3/2013 | Ditte et al. |
| 2013/0094024 A1 | 4/2013 | Ruhland et al. |
| 2013/0097882 A1* | 4/2013 | Bridges et al. .............. 33/503 |
| 2013/0125408 A1* | 5/2013 | Atwell et al. ............... 33/503 |
| 2013/0162472 A1 | 6/2013 | Najim et al. |
| 2013/0201487 A1 | 8/2013 | Ossig et al. |
| 2013/0205606 A1* | 8/2013 | Briggs et al. ............... 33/503 |
| 2013/0212889 A9 | 8/2013 | Bridges et al. |
| 2013/0222816 A1 | 8/2013 | Briggs et al. |
| 2013/0239424 A1* | 9/2013 | Tait ............................. 33/503 |
| 2013/0300740 A1 | 11/2013 | Snyder et al. |
| 2014/0002608 A1 | 1/2014 | Atwell et al. |
| 2014/0012409 A1* | 1/2014 | McMurtry et al. ......... 700/180 |
| 2014/0049784 A1 | 2/2014 | Woloschyn et al. |
| 2014/0202016 A1* | 7/2014 | Bridges et al. .............. 33/503 |
| 2014/0240690 A1 | 8/2014 | Newman et al. |
| 2014/0259715 A1* | 9/2014 | Engel ........................... 33/503 |
| 2014/0268108 A1* | 9/2014 | Grau ........................... 356/72 |
| 2015/0002659 A1* | 1/2015 | Atwell et al. ............... 348/135 |

FOREIGN PATENT DOCUMENTS

| | | |
|---|---|---|
| DE | 10026357 A1 | 1/2002 |
| DE | 10137241 A1 | 9/2002 |
| DE | 10155488 A1 | 5/2003 |
| DE | 10219054 A1 | 11/2003 |
| DE | 10326848 A1 | 1/2005 |
| DE | 10361870 A | 7/2005 |
| DE | 102004015668 B3 | 9/2005 |
| DE | 102004015111 A1 | 10/2005 |
| DE | 102004028090 A1 | 12/2005 |
| DE | 10114126 B4 | 8/2006 |
| DE | 102004010083 B4 | 11/2006 |
| DE | 102005036929 B4 | 2/2007 |
| DE | 102005060967 A1 | 6/2007 |
| DE | 102006023902 | 11/2007 |
| DE | 102006024534 A1 | 11/2007 |
| DE | 102006035292 A1 | 1/2008 |

(56) References Cited

FOREIGN PATENT DOCUMENTS

| | | |
|---|---|---|
| DE | 102007037162 A1 | 2/2009 |
| DE | 102008039838 A1 | 3/2010 |
| DE | 102008062763 B3 | 7/2010 |
| DE | 102009001894 A1 | 9/2010 |
| DE | 102012109481 A1 | 4/2014 |
| EP | 0546784 A2 | 6/1993 |
| EP | 0667549 A2 | 8/1995 |
| EP | 0727642 A1 | 8/1996 |
| EP | 0767357 B1 | 5/2002 |
| EP | 2023077 A1 | 2/2009 |
| GB | 894320 | 4/1962 |
| GB | 1112941 | 5/1968 |
| GB | 2255648 A | 11/1992 |
| GB | 2336493 A | 10/1999 |
| GB | 2341203 A | 3/2000 |
| GB | 2388661 A | 11/2003 |
| GB | 2420241 A | 5/2006 |
| GB | 2447258 A | 9/2008 |
| GB | 2452033 A | 2/2009 |
| JP | 0357911 A | 3/1991 |
| JP | 04115108 A | 4/1992 |
| JP | 04225188 | 8/1992 |
| JP | 04267214 A | 9/1992 |
| JP | 0572477 A | 3/1993 |
| JP | 06313710 | 11/1994 |
| JP | 06331733 | 12/1994 |
| JP | 06341838 | 12/1994 |
| JP | 074950 A | 1/1995 |
| JP | 07128051 A | 5/1995 |
| JP | 07229963 A | 8/1995 |
| JP | 0815413 A | 1/1996 |
| JP | 0821714 A | 1/1996 |
| JP | 08129145 A | 5/1996 |
| JP | 08136849 A | 6/1996 |
| JP | 08262140 A | 10/1996 |
| JP | 09021868 | 1/1997 |
| JP | 10213661 A | 8/1998 |
| WO | 8801924 | 3/1988 |
| WO | 0014474 | 3/2000 |
| WO | 0020880 A2 | 4/2000 |
| WO | 0034733 | 6/2000 |
| WO | 0063681 A2 | 10/2000 |
| WO | 0177613 A1 | 10/2001 |
| WO | 02101323 A2 | 12/2002 |
| WO | 2004096502 A1 | 11/2004 |
| WO | 2005072917 A1 | 8/2005 |
| WO | 2005075875 | 8/2005 |
| WO | 2005100908 A1 | 10/2005 |
| WO | 2006014445 A1 | 2/2006 |
| WO | 2006051264 A1 | 5/2006 |
| WO | 2007002319 A1 | 1/2007 |
| WO | 2007051972 A1 | 5/2007 |
| WO | 2007118478 A1 | 10/2007 |
| WO | 2007144906 A1 | 12/2007 |
| WO | 2008019856 A1 | 2/2008 |
| WO | 2008027588 A2 | 3/2008 |
| WO | 2008047171 A1 | 4/2008 |
| WO | 2008052348 A1 | 5/2008 |
| WO | 2008064276 A3 | 5/2008 |
| WO | 2008066896 A2 | 6/2008 |
| WO | 2008068791 A1 | 6/2008 |
| WO | 2008075170 A1 | 6/2008 |
| WO | 2009001165 A1 | 12/2008 |
| WO | 2009016185 A1 | 2/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000955 A1 | 1/2011 |
| WO | 2011021103 A1 | 2/2011 |
| WO | 2011029140 A1 | 3/2011 |
| WO | 2011057130 A2 | 5/2011 |
| WO | 2011002908 A1 | 6/2011 |
| WO | 2011090829 A2 | 7/2011 |
| WO | 2011090895 A1 | 7/2011 |
| WO | 2012037157 A2 | 3/2012 |
| WO | 2012038446 A1 | 3/2012 |
| WO | 2012013525 A2 | 8/2012 |
| WO | 2012112683 A2 | 8/2012 |
| WO | 2013188026 A1 | 12/2013 |
| WO | 2013190031 A1 | 12/2013 |
| WO | 2014128498 A2 | 8/2014 |

OTHER PUBLICATIONS

Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Confer.

Cho, et al., Implementation of a Precision Time Protocol over Low Rate Wireless Personal Area Networks, IEEE, 2008.

Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.

Decision Revoking the European Patent (Art. 101(3)(b) EPC) dated Aug. 14, 2013, filed in Opposition re Application No. 07 785 873.6/ Patent No. 2 062 069, Proprietor: Faro Technologies, Inc., filed by Leica Geosystem AG on Feb. 5, 2013, 12 pages.

Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98.

EO Edmund Optics "Silicon Detectors" (5 pages) 2013 Edmund Optics, Inc. http://www.edmundoptics.com/electro-optics/detector-components/silicon-detectors/1305[Oct. 15, 2013 10:14:53 AM].

Patrick Willoughby; "Elastically Averaged Precision Aligment"; In: "Doctoral Thesis"; Jun. 1, 2005; Massachusetts Institute of Technology; XP55005620; Abstract 1.1 Motivation; Chapter 3, Chapter 6.

FARO Laserscanner LS, Presentation Forensic Package, Policeschool of Hessen, Wiesbaden, Germany, Dec. 14, 2005; FARO Technologies, Copyright 2008.

FARO Product Catalog; Faro Arm; 68 pages; FARO Technologies Inc. 2009; printed Aug. 3, 2009.

Franklin, Paul F., What IEEE 1588 Means for Your Next T&M System Design, Keithley Instruments, Inc., [on-line] Oct. 19, 2010, http://www.eetimes.com/General/ DisplayPrintViewContent?contentItemId=4209746, [Retreived Oct. 21, 2010].

Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.

GHOST 3D Systems, Authorized MicroScribe Solution, FAQs—MicroScribe 3D Laser, MicroScan Tools, & related info, [online], [retrieved Nov. 29, 2011], http://microscribe.ghost3d.com/gt_microscan-3d_faqs.htm.

Godin, G., et al., A Method for the Registration of Attributed Range Images, Copyright 2001, [Retrieved on Jan. 18, 2010 at 03:29 from IEEE Xplore].

Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.

Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.

Howard, et al., "Virtual Environments for Scene of Crime Reconstruction and Analysis", Advanced Interfaces Group, Department of Computer Science, University of Manchester, Manchester, UK, Feb. 28, 2000.

Huebner, Siegfried F. , "Sniper Shooting Techniques", "Scharfschutzen-Schiesstechnik", 1989, with English translation.

HYDROpro Navigation, Hydropgraphic Survey Software, Trimble, www.trimble.com, Copyright 1997-2003.

(56) References Cited

OTHER PUBLICATIONS

Information on Electro-Optical Information Systems; EOIS 3D Mini-Moire C.M.M. Sensor for Non-Contact Measuring & Surface Mapping; Direct Dimensions, Jun. 1995.
Ingensand, H., Dr., "Introduction to Geodetic Metrology", "Einfuhrung in die Geodatische Messtechnik", Federal Institute of Technology Zurich, 2004, with English translation.
P Ben-Tzvi, et al "Extraction of 3D Images Using Pitch-Actuated 2D Laser Range Finder for Robotic Vision" (6 pages) BNSDOCID <XP 31840390A_1_>, Oct. 15, 2010.
IPRP dated Dec. 18, 2014 corresponding to PCT/US13/041826.
IPRP dated Dec. 24, 2014 corresponding to PCT/US13/040309.
IPRP dated Dec. 24, 2014 corresponding to PCT/US13/040321.
iQsun Laserscanner Brochure, 2 Pages, Apr. 2005.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/servlet/Ge.
Jasperneite, et al., Enhancements to the Time Synchronization Standard IEEE-1588 for a System of Cascaded Bridges, IEEE, 2004.
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
Langford, et al., "Practical Skills in Forensic Science", Pearson Education Limited, Essex, England, First Published 2005, Forensic Chemistry.
Leica Geosystems, FBI Crime Scene Case Study. 2006.
Leica Geosystems, TruStory Forensic Analysis by Albuquerque Police Department, 2006.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf.
Leica TPS800 Performance Series—Equipment List, 2004.
Merriam-Webster (m-w.com), "Interface". 2012. http://www.merriam-webster.com/dictionary/interface.
Merriam-Webster (m-w.com), "Parts". 2012. http://www.merriam-webster.com/dictionary/parts.
Merriam-Webster (m-w.com), "Traverse". 2012. http://www.merriam-webster.com/dictionary/traverse.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
Romer "Romer Measuring Arms Portable CMMs for R&D and shop floor" (Mar. 2009) Hexagon Metrology (16 pages).
MOOG Components Group; "Fiber Optic Rotary Joints; Product Guide" (4 pages) Dec. 2010; MOOG, Inc. 2010.
Office Action dated Oct. 24, 2014 corresponding to GB1418273.7.
RW Boyd "Radiometry and the Detection of Otpical Radiation" (pp. 20-23) 1983 Jon wiley & Sons, Inc.
Sauter, et al., Towards New Hybrid Networks for Industrial Automation, IEEE, 2009.
Williams, J.A., et al., Evaluation of a Novel Multiple Point Set Registration Algorithm, Copyright 2000, [Retrieved on Jan. 18, 2010 at 04:10 from IEEE Xplore].
Se, et al., "Instant Scene Modeler for Crime Scene Reconstruction", MDA, Space Missions, Ontario, Canada, Copyright 2005, IEEE.
Spada, et al., IEEE 1588 Lowers Integration Costs in Continuous Flow Automated Production Lines, XP-002498255, ARC Insights, Insight # 2003-33MD&H, Aug. 20, 2003.
Surman et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
A. Hart; "Kinematic Coupling Interchangeability" Precision Engineering; vol. 28, No. 1; Jan. 1, 2004 pp. 1-15.
Akca, Devrim, Full Automated Registration of Laser Scanner Point Clouds, Institute of Geodesy and Photogrammetry, Swiss Federal Institute of Technology, Zuerich, Switzerland; Published Dec. 2003.
Anonymous: So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006].
Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE.
Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.
Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.
Harrison A. et al., "High Quality 3D Laser Ranging Under General Vehicle Motion", 2008 IEEE International Conference on Robotics and Automation, May 19-23, 2008, pp. 7-12, XP031340123.
May, S. et al., "Robust 3D-Mapping with Time-of-Flight Cameras", Intelligent Robots and Systems, IROS 2009, IEEE/RSJ International Conference on Oct. 10, 2009, pp. 1673-1678, XP031581042.
Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.
Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.
Yan, R., et al., "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.
Ye, C. et al., "Characterization of a 2-D Laser Scanner for Mobile Robot Obstacle Negotiation" Proceedings/2002 IEEE International Conference on Robotics and Automation, May 11-15, 2012, Washington, D.C., May 1, 2002, pp. 2512-2518, XP009169742.
Office Action for Chinese Application No. 201180004746.4 date Jul. 21, 2015; 1-4 pages.
Office Action for DE Application No. 11 2013 002 824.7 date Jul. 22, 2015; 1-6 pages.
Office Action for DE Application No. 11 2013 003 076.4 date Jul. 23, 2015; 1-7 pages.

* cited by examiner

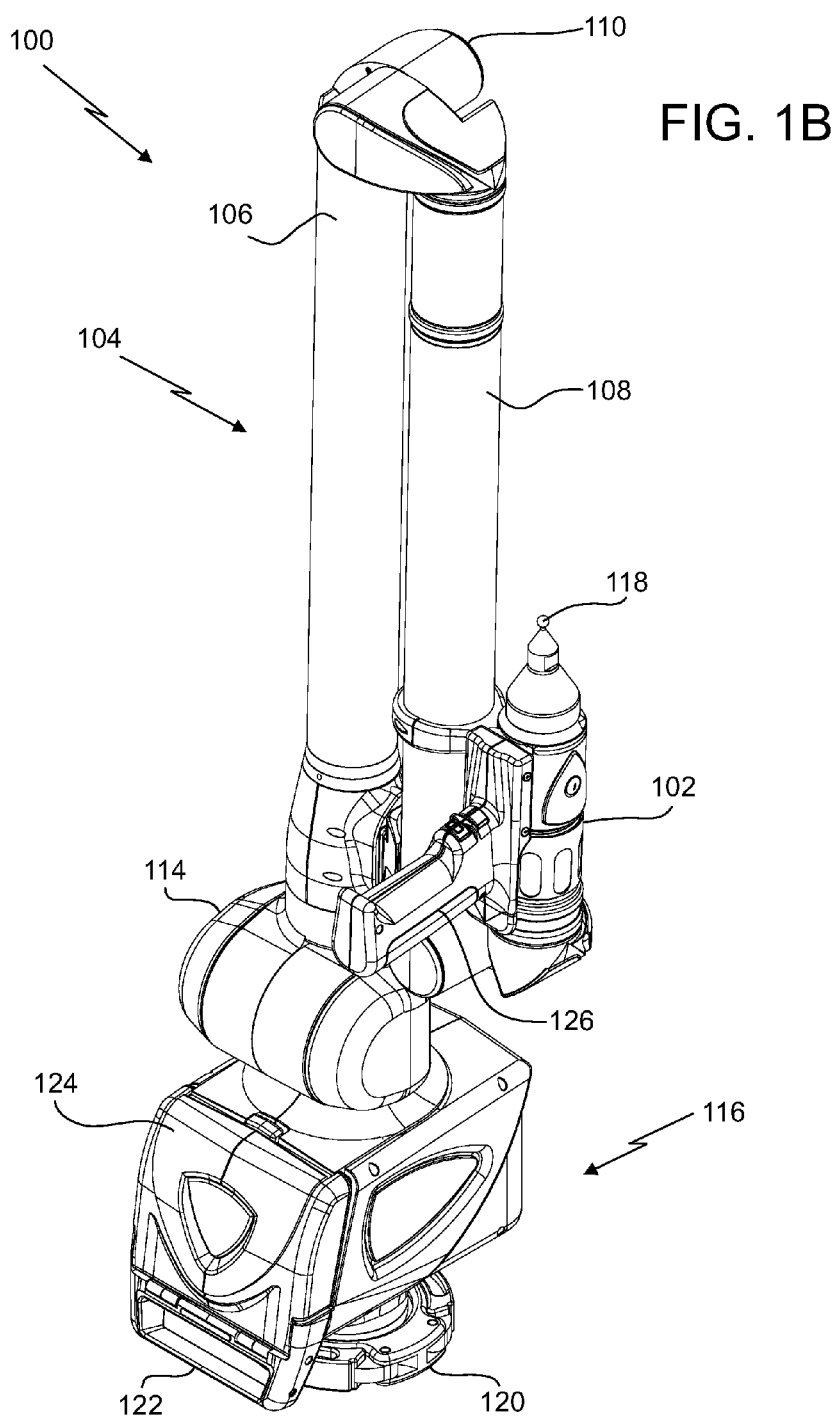

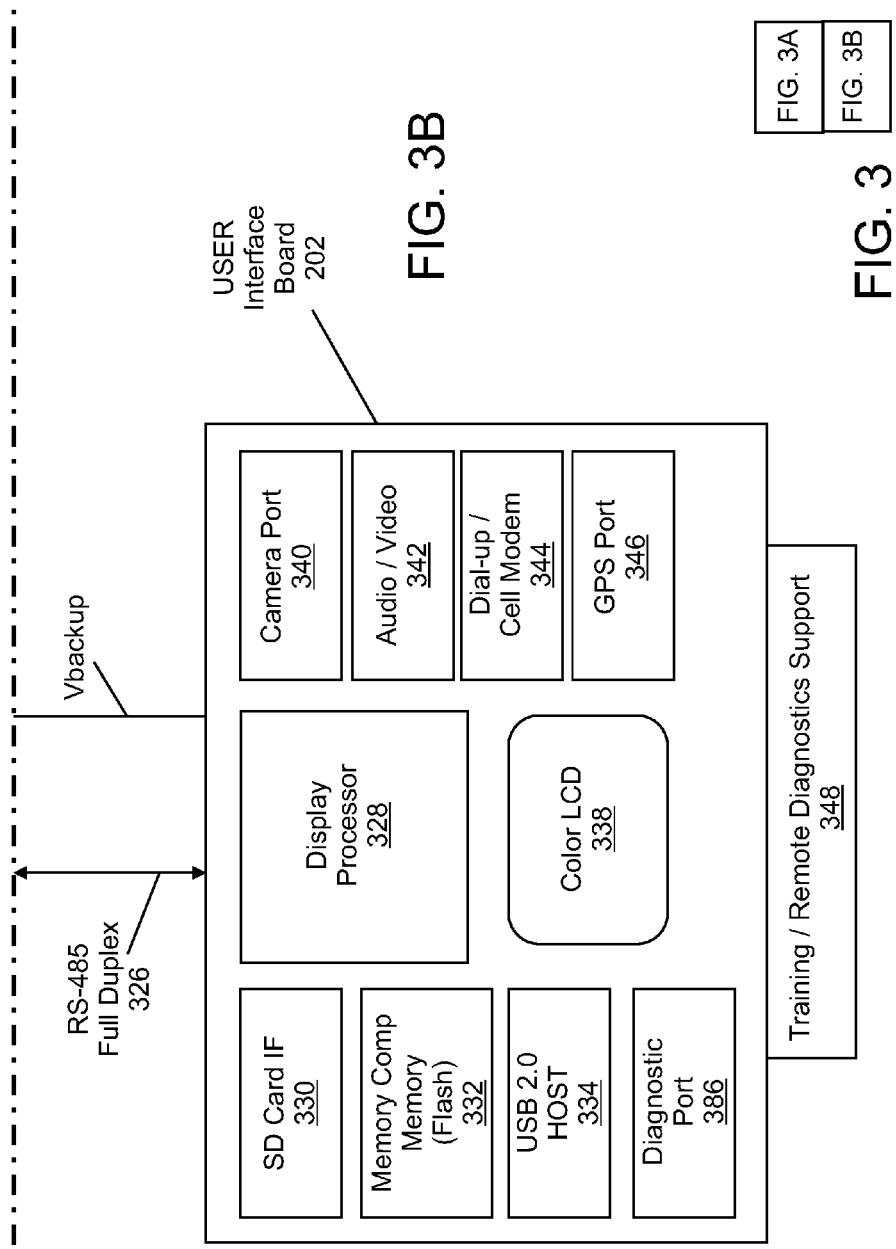

COORDINATE MEASUREMENT MACHINE WITH DISTANCE METER AND CAMERA TO DETERMINE DIMENSIONS WITHIN CAMERA IMAGES

CROSS-REFERENCE TO RELATED APPLICATIONS

The present application is a continuation-in-part of U.S. patent application Ser. No. 14/223,067, filed Mar. 24, 2014, which is a continuation-in-part of U.S. patent application Ser. No. 13/524,028, filed Jun. 15, 2012, now U.S. Pat. No. 8,677, 643, and claims the benefit of U.S. Provisional Patent Application No. 61/296,555, filed Jan. 20, 2010, U.S. Provisional Patent Application No. 61/355,279, filed Jun. 16, 2010, and U.S. Provisional Patent Application No. 61/351,347, filed on Jun. 4, 2010. The present application is also a continuation-in-part of PCT Application No. PCT/US13/040321 filed on May 9, 2013. The contents of all of the above are hereby incorporated by reference in their entirety.

BACKGROUND

The present disclosure relates to a coordinate measuring machine, and more particularly to a portable articulated arm coordinate measuring machine having a probe end to which a camera and a distance meter are attached and in which distances between points within images captured by the camera may be determined.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Three-dimensional surfaces may be measured using non-contact techniques as well. One type of non-contact device, sometimes referred to as a laser line probe, emits a laser light either on a spot, or along a line. An imaging device, such as a charge-coupled device (CCD) for example, is positioned adjacent the laser to capture an image of the reflected light from the surface. The surface of the object being measured causes a diffuse reflection. The image on the sensor will change as the distance between the sensor and the surface changes. By knowing the relationship between the imaging sensor and the laser and the position of the laser image on the sensor, triangulation methods may be used to measure points on the surface.

While existing CMMs are suitable for their intended purposes, what is needed is a portable AACMM that has certain features of embodiments of the present invention.

SUMMARY OF THE INVENTION

In accordance with one embodiment of the invention, a three-dimensional (3D) measuring device includes an articulated arm coordinate measurement machine (AACMM), the AACMM including a base and a manually positionable arm portion having opposed first and second ends, the arm portion including a plurality of connected arm segments, each arm segment including at least one position transducer for producing a position signal, the first end attached to the base, a camera coupled to the second end, a non-contact 3D measurement device coupled to the second end, the noncontact 3D measurement device having a light source, the noncontact 3D measurement device configured to determine a distance to an object point based at least in part on the speed of light in air, and an electronic circuit which receives the position signal from the at least one position transducer and provides data corresponding to a position of the camera and the non-contact 3D measurement device; a processor system including at least one of an AACMM processor, an external computer, and a cloud computer configured for remote access, wherein the processor system is responsive to executable instructions which when executed by the processor system is operable to: cause the light source to send a first beam of light to a first object point; cause the noncontact 3D measurement device to receive a first reflected light and determine a first distance to the first object point in response, the first reflected light being a portion of the first beam of light reflected by the first object point; determine an angle of the first beam of light relative to the AACMM based at least in part on first position signals from the transducers; determine first 3D coordinates of the first object point based at least in part on the first distance and a first angle of the first beam of light relative to the AACMM; cause the camera to obtain a first 2D image of a first surface, the first 2D image having a first spot of light caused by the first beam of light intersecting the first surface at the first object point; and associate the first 3D coordinates to the first spot of light.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A and 1B, are perspective views of a portable articulated arm coordinate measuring machine (AACMM) having embodiments of various aspects of the present invention therewithin;

DETAILED DESCRIPTION

Portable articulated arm coordinate measuring machines ("AACMM") are used in a variety of applications to obtain measurements of objects. Embodiments of the present invention provide advantages in allowing an operator to easily and quickly couple accessory devices to a probe end of the AACMM that use structured light to provide for the non-contact measurement of a three-dimensional object. Embodiments of the present invention provide further advantages in providing for communicating data representing a distance to an object measured by the accessory. Embodiments of the present invention provide still further advantages in providing power and data communications to a removable accessory without having external connections or wiring.

Figure 1A:
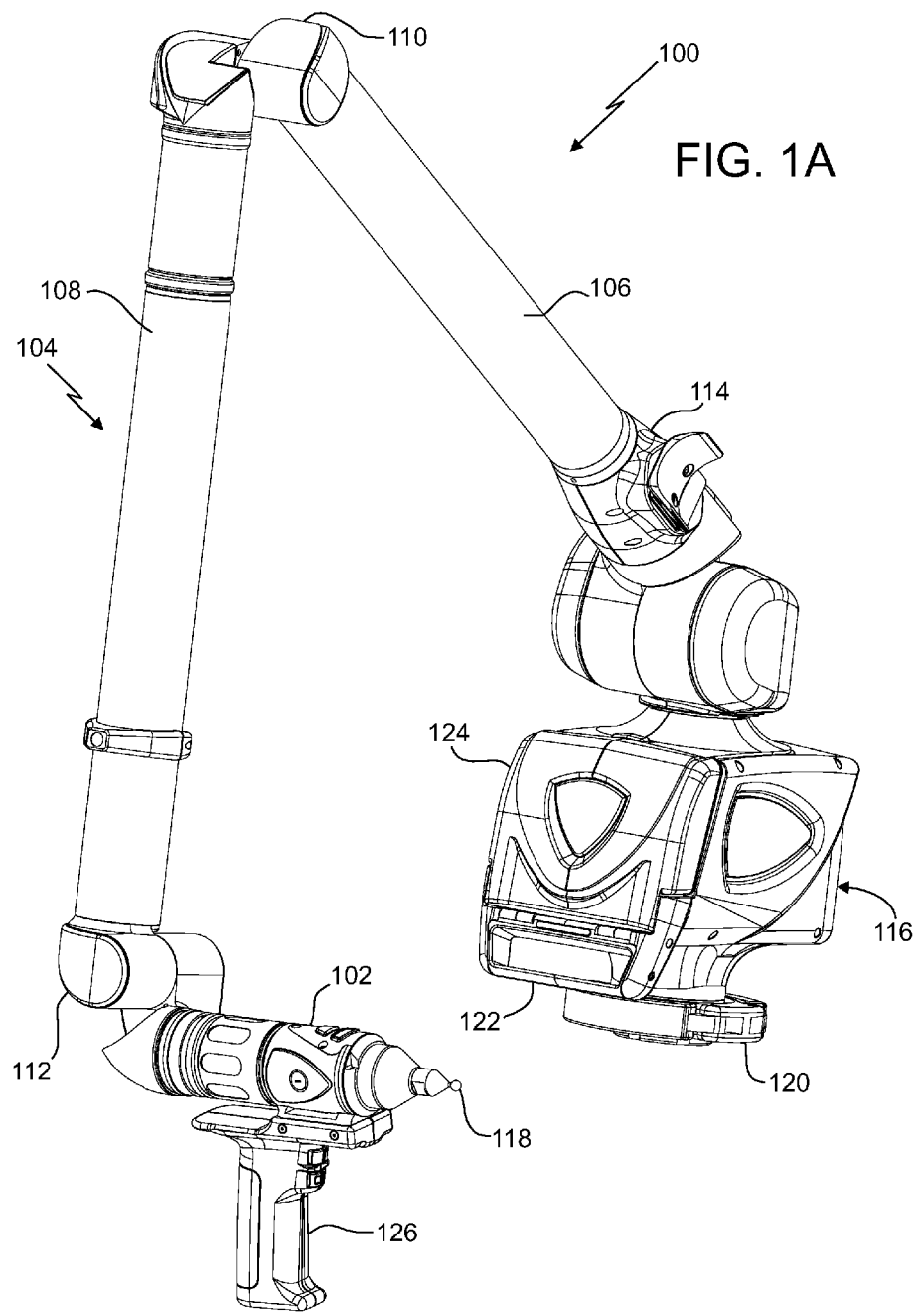
Figure 4:
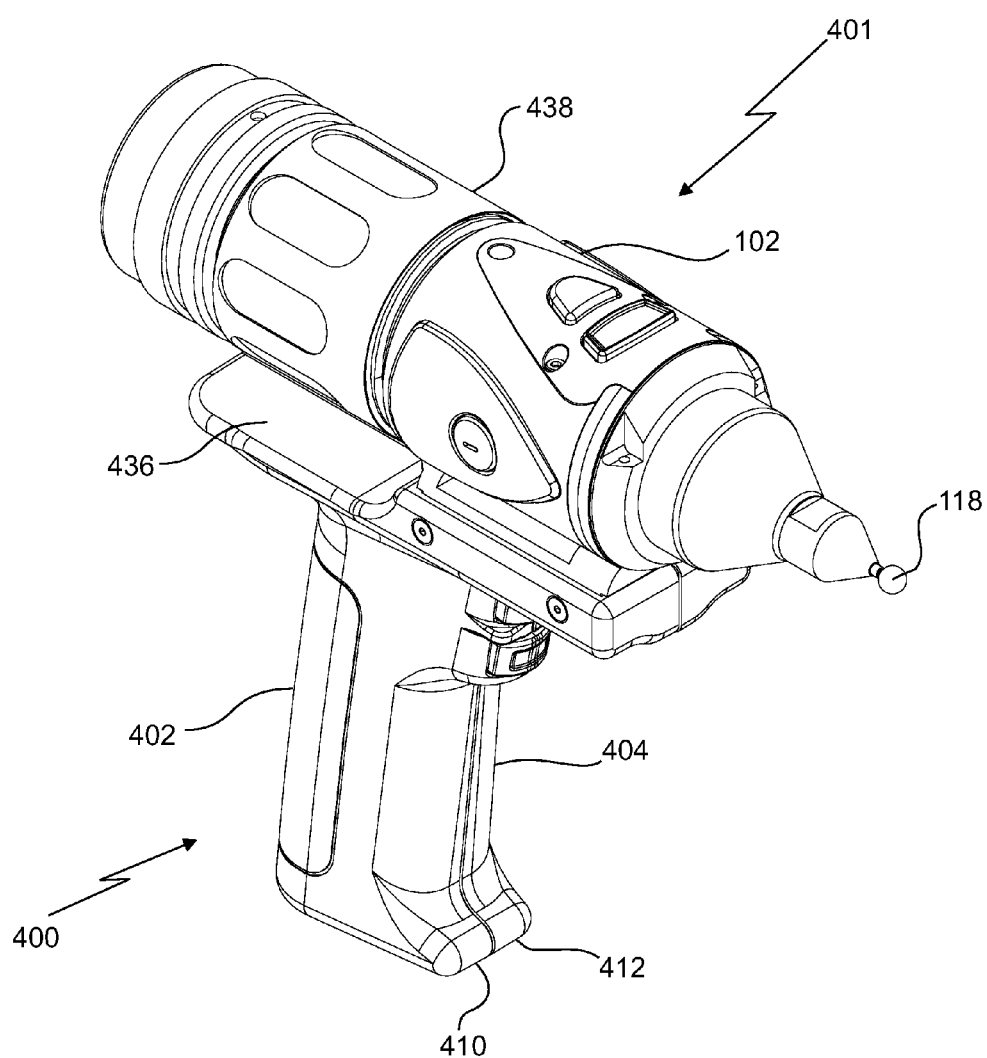
FIG. 4 is an isometric view of the probe end of the AACMM of FIG. 1 according to an embodiment.

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 (FIG. 4) that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of an axis of rotation for the AACMM 100 (e.g., a cartridge containing an encoder system that determines movement of the measurement device, for example a probe 118, in an axis of rotation for the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As will be discussed in more detail below, the handle 126 may be replaced with another device configured to provide non-contact distance measurement of an object, thereby providing advantages in allowing the operator to make both contact and non-contact measurements with the same AACMM 100. In exemplary embodiments, the probe 118 is a contacting measurement device and is removable. The probe 118 may have different tips 118 that physically contact the object to be measured, including, but not limited to: ball, touch-sensitive, curved and extension type probes. In other embodiments, the measurement is performed, for example, by a non-contacting device such as an interferometer or an absolute distance measurement (ADM) device. In an embodiment, the handle 126 is replaced with the coded structured light scanner device using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end 401.

In various embodiments, each grouping of bearing cartridges 110, 112, 114 allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a noncontact distance measurement device that can be mounted to the removable handle 126 on the AACMM 100). The electronics that support these peripheral hardware devices or features may be located in each of the bearing cartridge groupings 110, 112, 114 located within the portable AACMM 100.

Figure 2A:
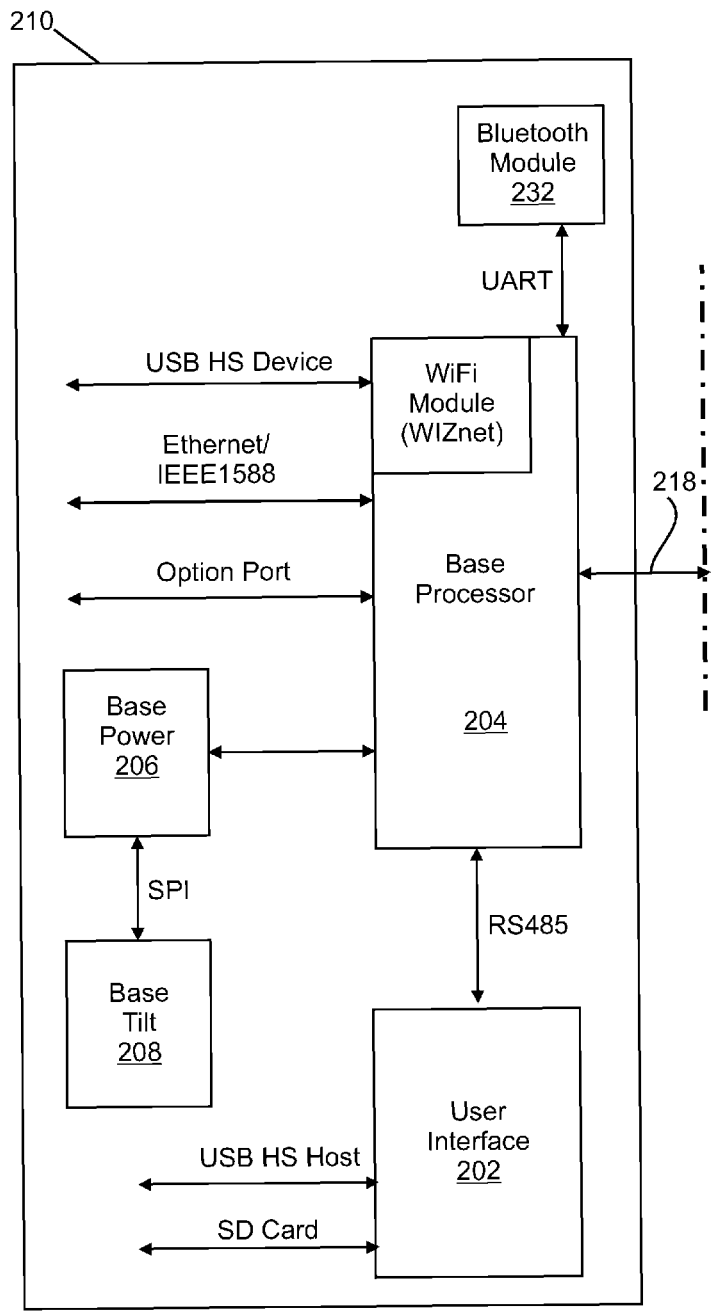
FIG. 2, including FIGS. 2A-2D taken together, is a block diagram of electronics utilized as part of the AACMM of FIG. 1 in accordance with an embodiment.
Figure 2B:
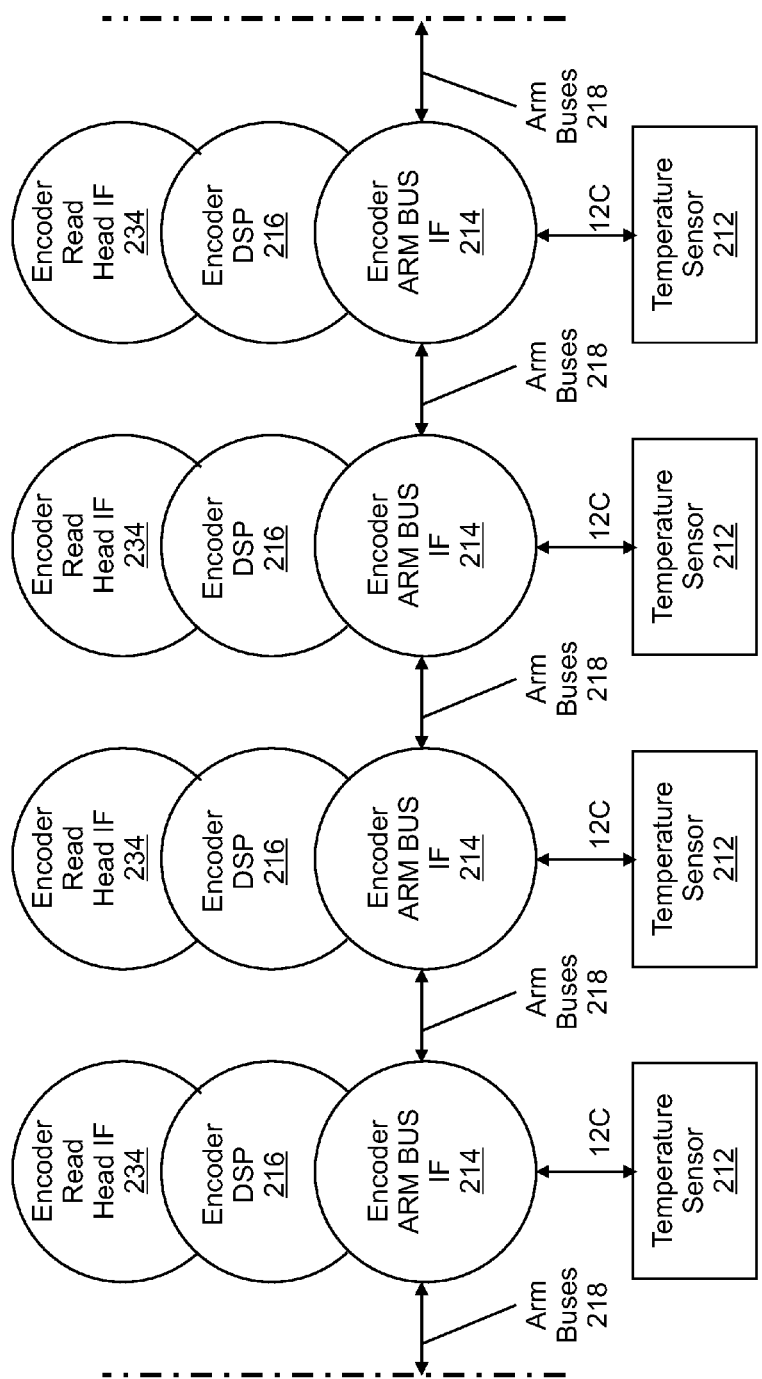
Figure 2C:
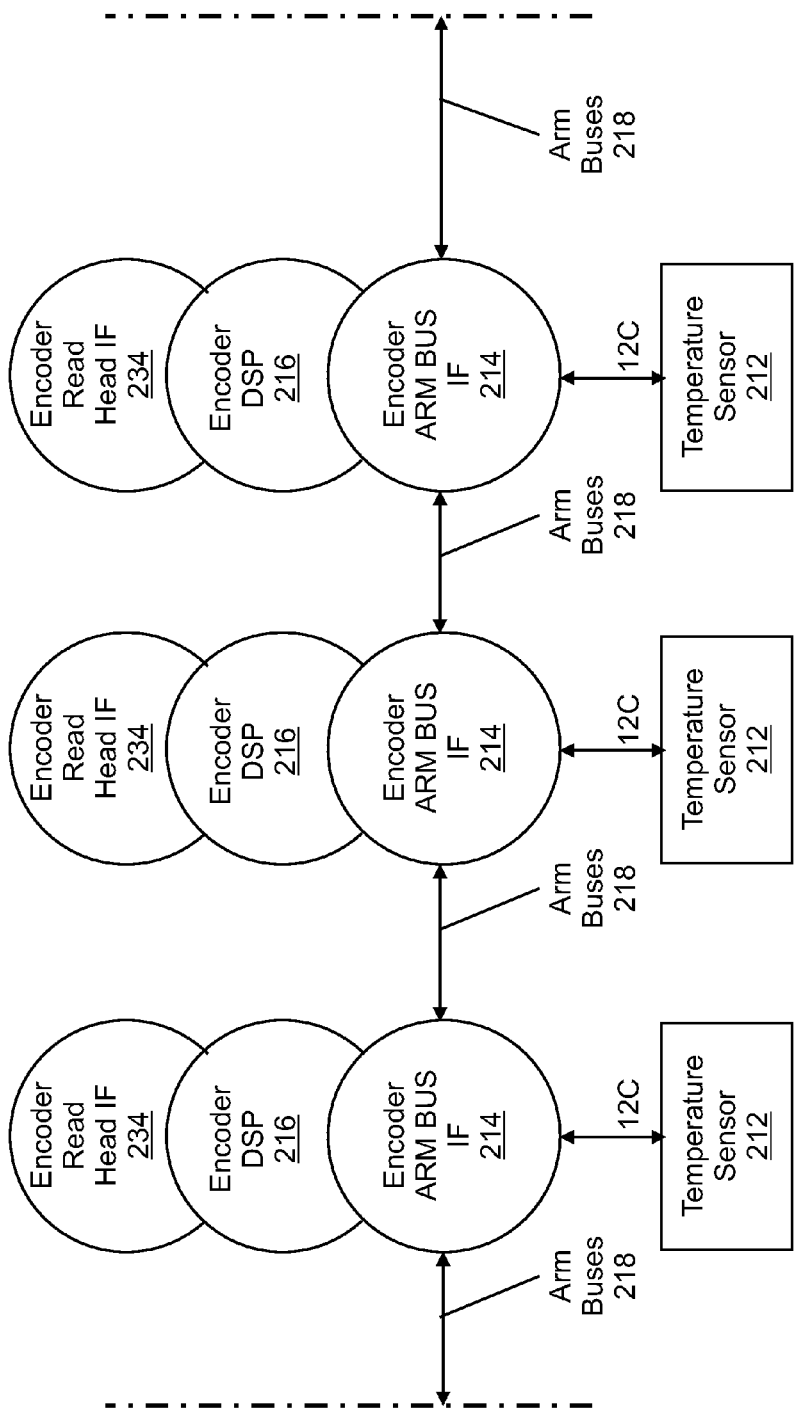
Figure 2D:
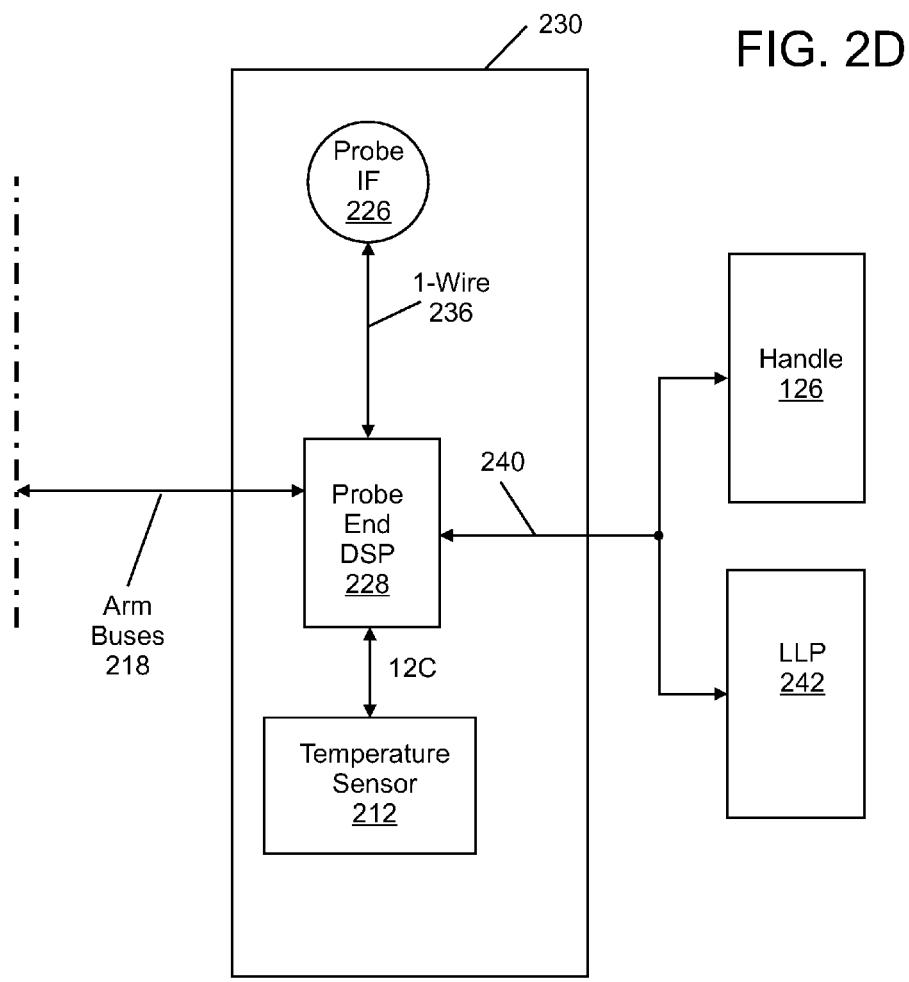
Figure 2:
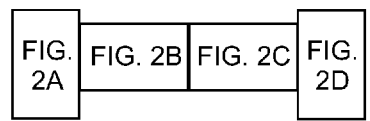

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2A, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the noncontact distance measurement device 242 via the quick-connect interface in an embodiment, and a probe interface 226. The quick-connect interface allows access by the handle 126 to the data bus, control lines, and power bus used by the noncontact distance measurement device 242 and other accessories. In an embodiment, the probe end electronics 230 are located in the measurement probe housing 102 on the AACMM 100. In an embodiment, the handle 126 may be removed from the quick-connect interface and measurement may be performed by the noncontact distance measurement device 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

Figure 3A:
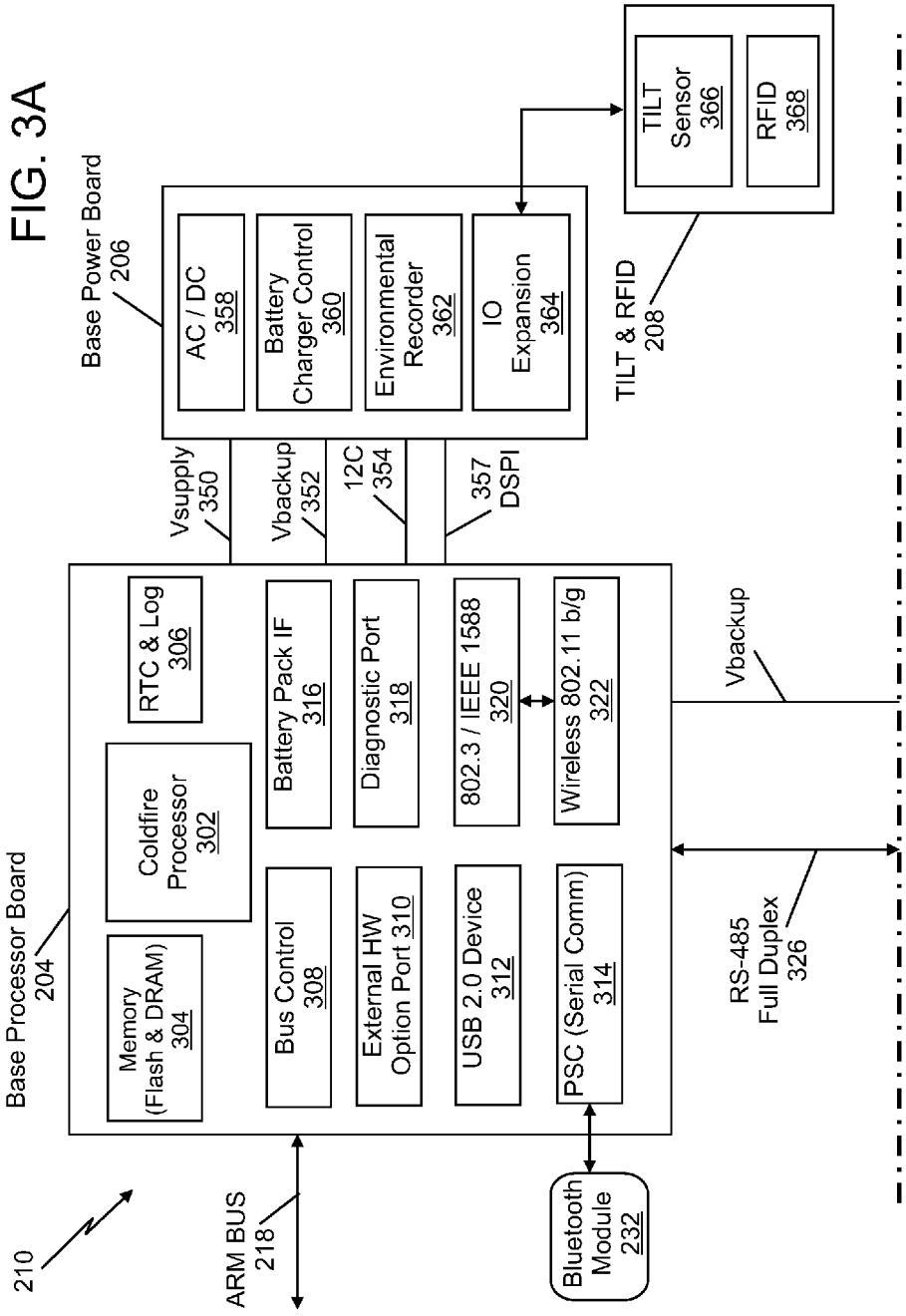
FIG. 3, including FIGS. 3A and 3B taken together, is a block diagram describing detailed features of the electronic data processing system of FIG. 2 in accordance with an embodiment.

FIG. 3A is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as a noncontact distance measurement device 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 7:
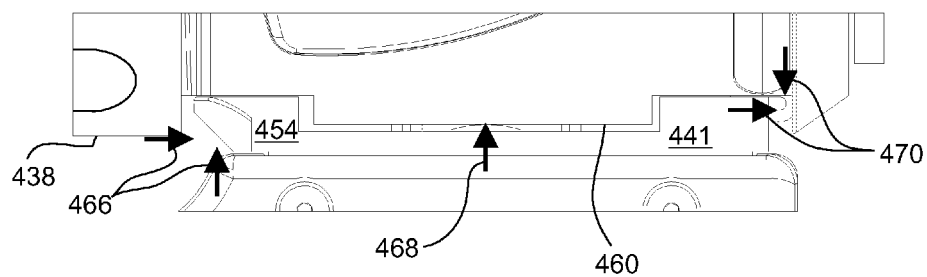
FIG. 7 is an enlarged partial side view of the interface portion of the probe end of FIG. 6 according to an embodiment.
Figure 8:
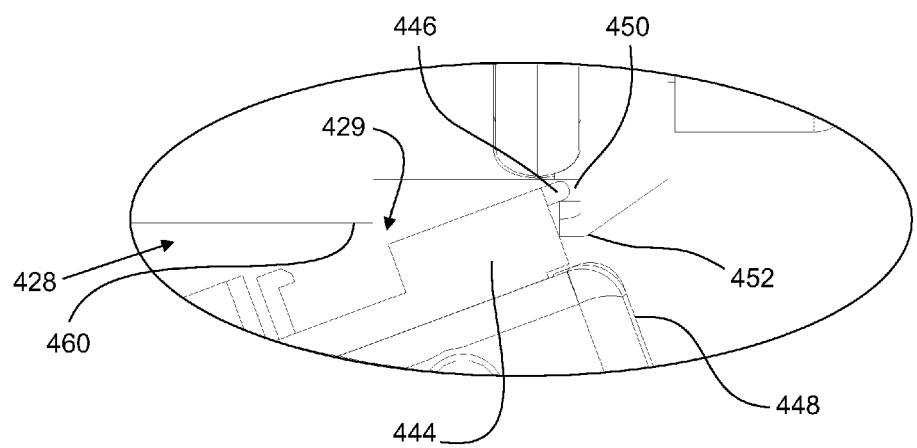
FIG. 8 is another enlarged partial side view of the interface portion of the probe end of FIG. 5 according to an embodiment.
Figure 9:
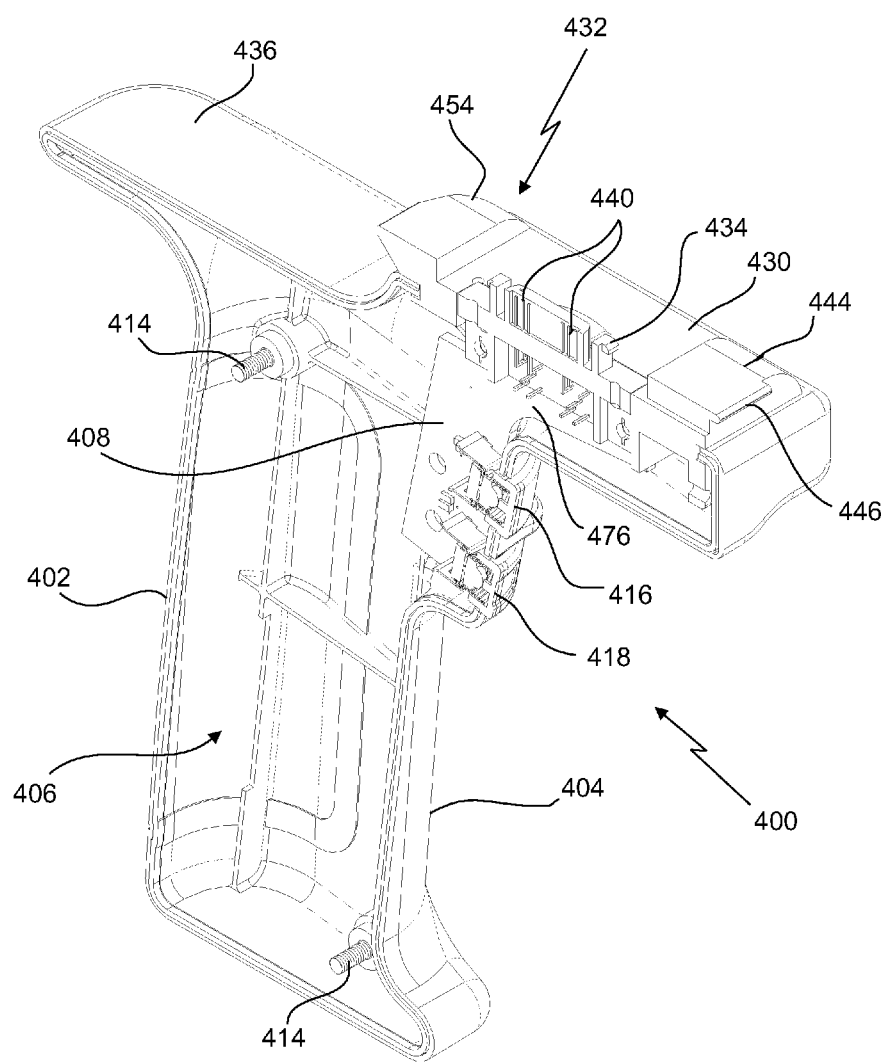
FIG. 9 is an isometric view partially in section of the handle of FIG. 4 according to an embodiment.
Figure 10:
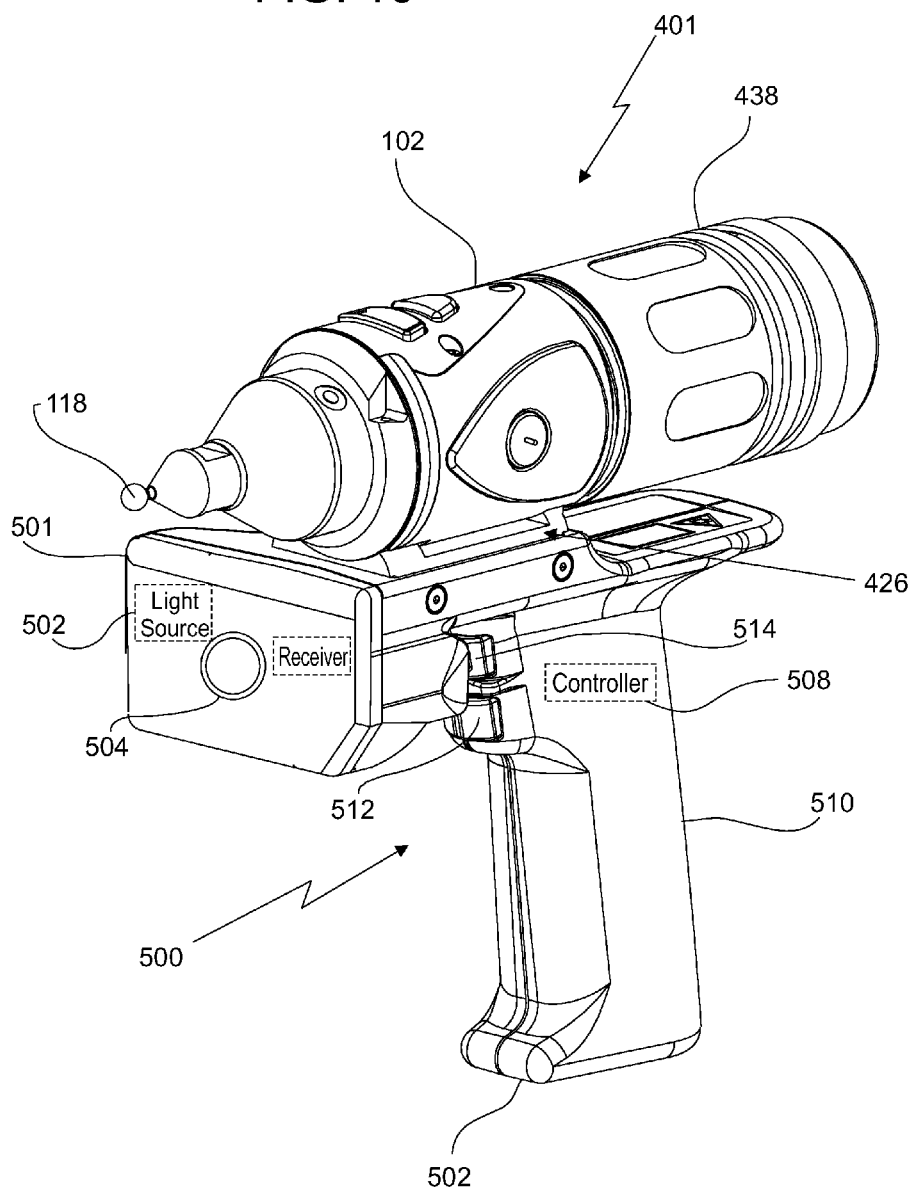
FIG. 10 is an isometric view of the probe end of the AACMM of FIG. 1 with a noncontact distance measurement device attached, according to an embodiment.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of an axis of rotation for AACMM 100.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
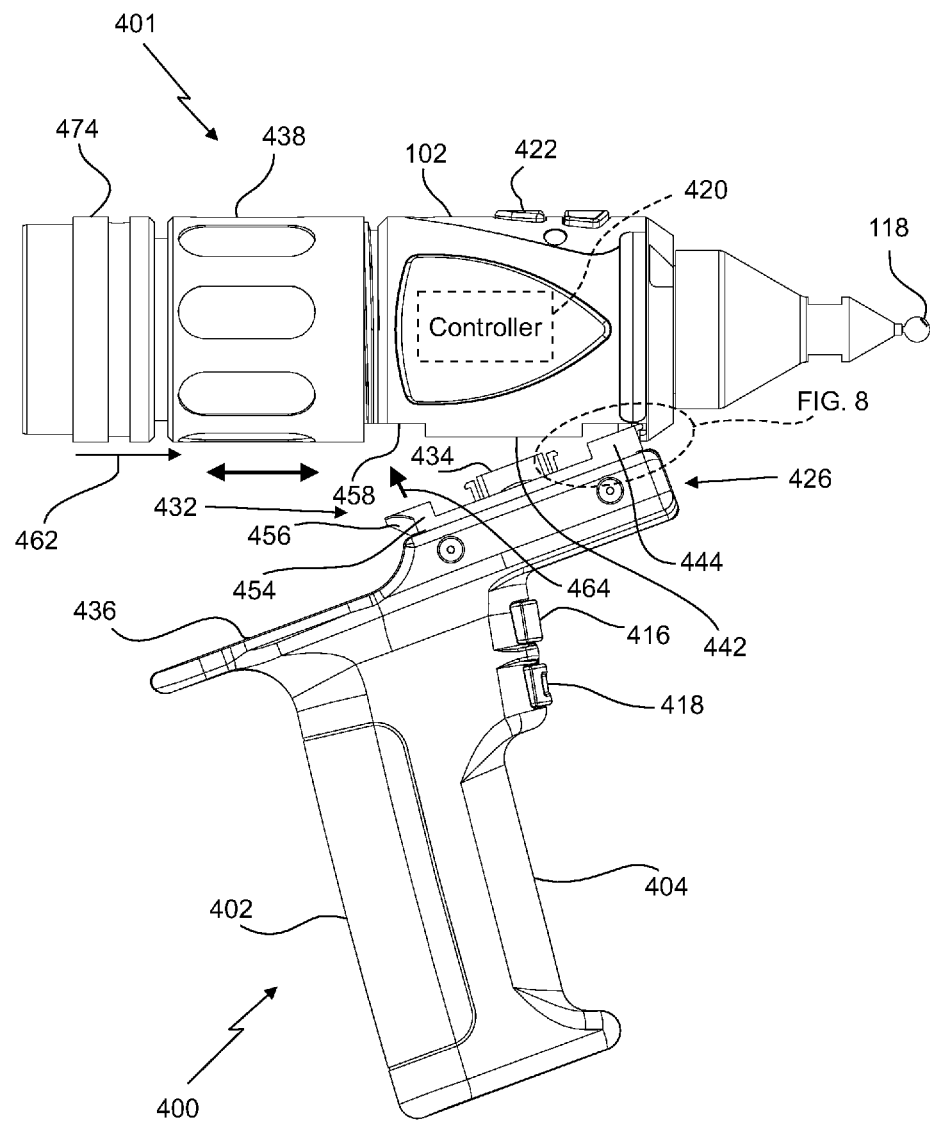
FIG. 5 is a side view of the probe end of FIG. 4 with the handle being coupled thereto, according to embodiment.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
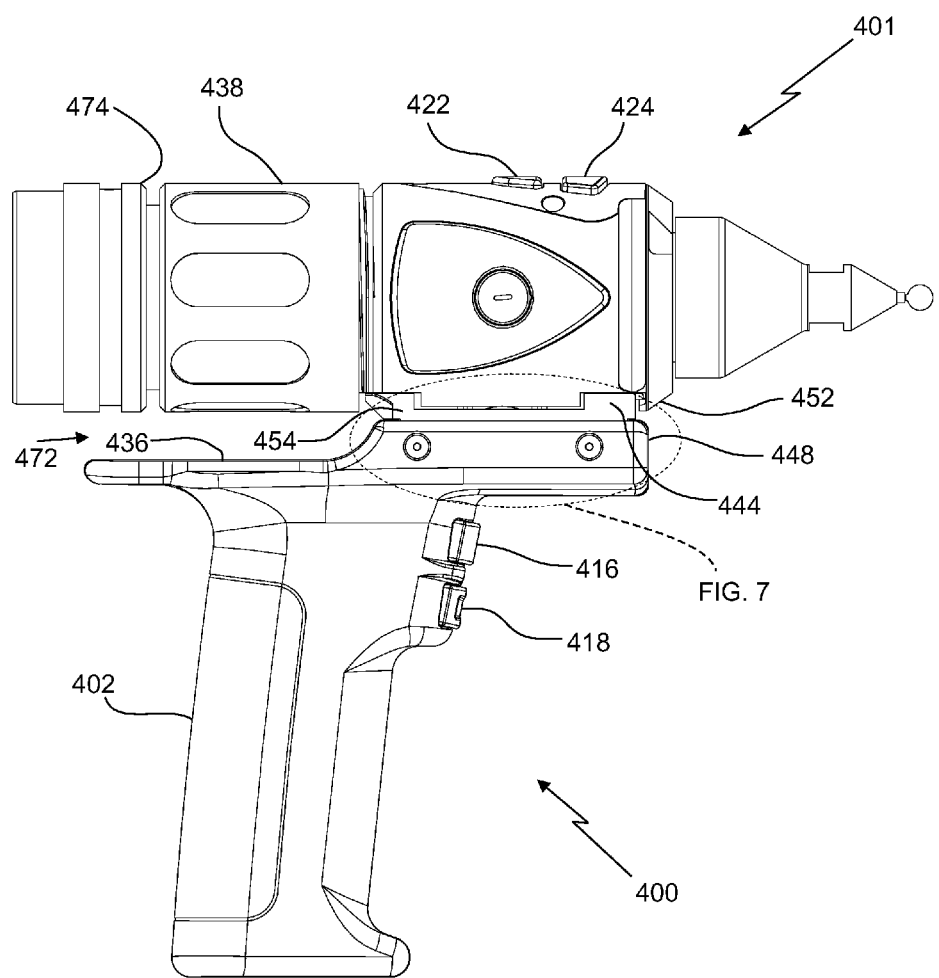
FIG. 6 is a side view of the probe end of FIG. 4 with the handle attached, according to an embodiment.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protect the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the coded structured light scanner device. This provides advantages in simplifying the requirements of controller 420 and allows for upgraded or increased functionality through the addition of accessory devices.

Referring to FIGS. 10-14, a device 500 is shown that allows for non-contact measurement of an object. In one embodiment, the device 500 is removably coupled to the probe end 401 via the coupler mechanism and interface 426. In another embodiment, the device 500 is integrally connected to the probe end 401. As will be discussed in more detail below, the device 500 may be an interferometer (FIG. 11) an absolute distance measurement (ADM) device (FIG. 12), a focusing meter (FIG. 13 and FIG. 14) or another type of non-contact distance measurement device.

The device 500 further includes an enclosure 501 with a handle portion 510. In one embodiment, the device 500 may further include an interface 426 on one end that mechanically and electrically couples the device 500 to the probe housing 102 as described herein above. The interface 426 provides advantages in allowing the device 500 to be coupled and removed from the AACMM 100 quickly and easily without requiring additional tools. In other embodiments, the device 500 may be integrated into the probe housing 102.

The device 500 includes an electromagnetic radiation transmitter, such as a light source 502 that emits coherent or incoherent light, such as a laser light or white light for example. The light from light source 502 is directed out of the device 500 towards an object to be measured. The device 500 may include an optical assembly 504 and an optical receiver 506. The optical assembly 504 may include one or more lenses, beam splitters, dichromatic mirrors, quarter wave plates, polarizing optics and the like. The optical assembly 504 splits the light emitted by the light source and directs a portion towards an object, such as a retroreflector for example, and a portion towards the optical receiver 506. The optical receiver 506 is configured receive reflected light and the redirected light from the optical assembly 504 and convert the light into electrical signals. The light source 502 and optical receiver 506 are both coupled to a controller 508. The controller 508 may include one or more microprocessors, digital signal processors, memory and signal conditioning circuits.

Further, it should be appreciated that the device 500 is substantially fixed relative to the probe tip 118 so that forces on the handle portion 510 do not influence the alignment of the device 500 relative to the probe tip 118. In one embodiment, the device 500 may have an additional actuator (not shown) that allows the operator to switch between acquiring data from the device 500 and the probe tip 118.

The device 500 may further include actuators 512, 514 which may be manually activated by the operator to initiate operation and data capture by the device 500. In one embodiment, the optical processing to determine the distance to the object is performed by the controller 508 and the distance data is transmitted to the electronic data processing system 210 via bus 240. In another embodiment optical data is transmitted to the electronic data processing system 210 and the distance to the object is determined by the electronic data processing system 210. It should be appreciated that since the device 500 is coupled to the AACMM 100, the electronic processing system 210 may determine the position and orientation of the device 500 (via signals from the encoders) which when combined with the distance measurement allow the determination of the X, Y, Z coordinates of the object relative to the AACMM.

Figure 11:
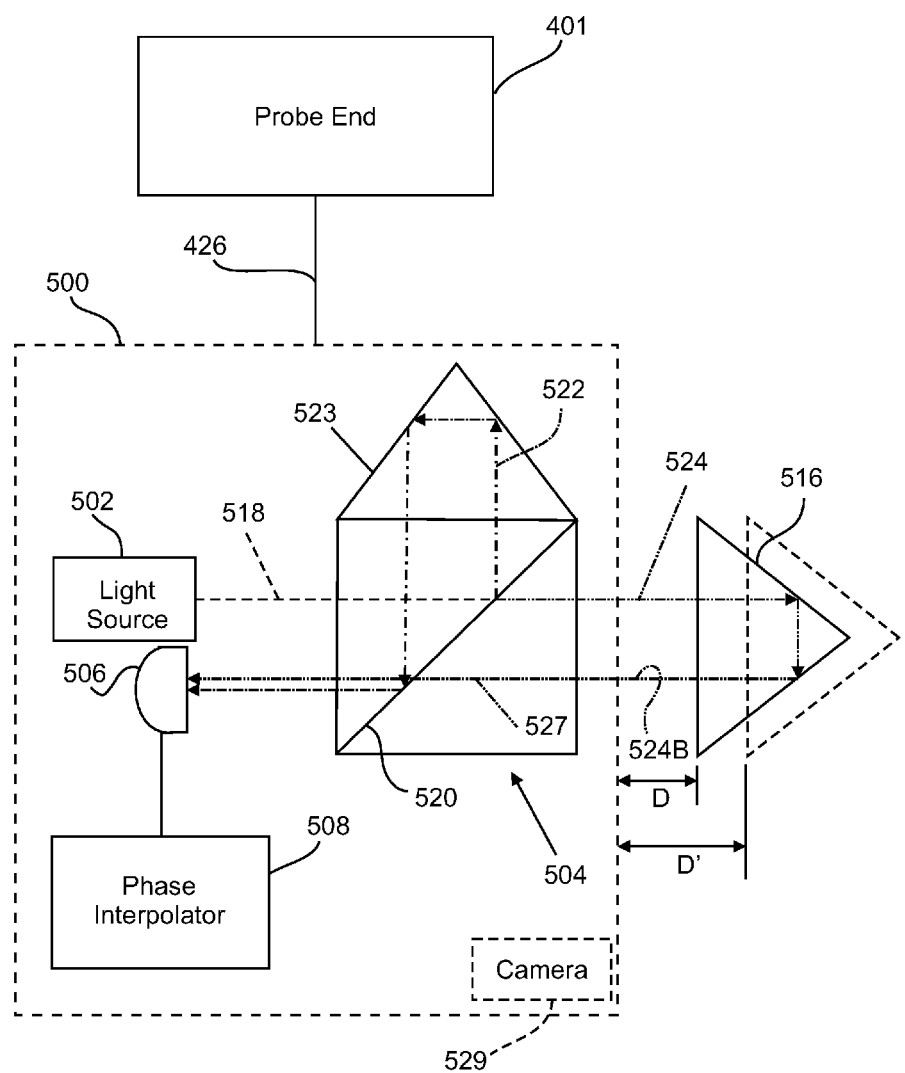
FIG. 11 is a schematic view of an embodiment wherein the device of FIG. 10 is an interferometer system according to an embodiment.

In one embodiment, the device 500 shown in FIG. 11 is an interferometer. An interferometer is a type of distance meter that sends a beam of coherent light, such as laser light for example, to a point on an object. In the exemplary embodiment, the object is an external retroreflector 516 for example. The interferometer combines the returned light with a reference beam of light to measure a change in distance of an object. By arranging the retroreflector 516 at an initial position where the distance D is known, as the retroreflector 516 is moved to a new position the distance D' may be determined. With an ordinary or incremental interferometer, the distance is determined by counting half-wavelengths since the interference pattern of the light repeats for every half wavelength of movement of the object point relative to the distance meter. The retroreflector 516 may be a spherically mounted retroreflector that comprises a metal sphere into which a cube corner retroreflector is embedded. The cube corner retroreflector comprises three perpendicular mirrors that come together at a common apex point. In an embodiment, the apex point is placed at the center of the metal sphere. By holding the sphere in contact with an object, the distance to object surface points may be measured by the interferometer. The retroreflector 516 may also be any other type of device that sends the light back parallel to the outgoing light.

In an embodiment, the device 500 is an incremental interferometer. The incremental interferometer has a measured distance D calculated using D=a+(m+p)*(lambda/2)*c/n, where "a" is a constant, "m" is the integer number of counts that have transpired in the movement of a target, "p" is the fractional part of a cycle (a number 0 to 1 corresponding to a phase angle of 0 to 360 degrees), "lambda" is the wavelength of the light in vacuum, "c" is the speed of light in vacuum, and "n" is the index of refraction of the air at wavelength of the light 524 at the temperature, barometric pressure, and humidity of the air through which the light 524 passes. The index of refraction is defined as the speed of light in vacuum divided by the speed of light in a local medium (in this case air), and so it follows that the calculated distance D depends on the speed of light in air "c/n". In an embodiment, light 518 from a light source 502 passes through a interferometer optic 504, travels to a remote retroreflector 516, passes through the interferometer optic 504 in a return path, and enters an optical receiver. The optical receiver is attached to a phase interpolator. Together the optical receiver and phase interpolator include optics and electronics to decode the phase of the returning light and to keep track of the number of half-wavelength counts. Electronics within the phase interpolator or elsewhere within the articulated arm 100 or in an external computer determine the incremental distance moved by the retroreflector 516. The incremental distance traveled by the retroreflector 516 of FIG. 11 is D'-D. A distance D' at any given time may be determined by first finding the position of the retroreflector at a reference position, which might for example be a distance D from a reference point on the articulated arm CMM. For example, if the retroreflector resides within a spherically mounted retroreflector (SMR), a distance D' may be found by first locating the retroreflector 516 at a reference location, which might be for example a magnetic nest configured to hold the SMR. Thereafter, as long as the beam is not broken between the source of light 502 and the retroreflector 516, the total distance D' can be determined by using a reference distance as the value "a" in the equation discussed hereinabove. A reference distance might be determined, for example, by measuring a reference sphere with the scanner held at a variety of orientations. By self-consistently solving for the coordinates of the reference sphere, the reference distance can be determined.

FIG. 11 shows an emitted outgoing beam of light 524 travelling parallel to, but offset from, the returning beam of light 524B. In some cases, it may be preferable to have the light return on itself so that the light 524 and 524B are traveling along the same path but in opposite directions. In this case, it may be important to use an isolation method to keep reflected light from entering and destabilizing the light source 520. One means for isolating the laser from the returning light is to place a Faraday isolator in the optical pathway between the light source 502 and the returning light 524B.

In one embodiment of an incremental interferometer, the interferometer is a homodyne type of the device such that the light source 502 is a laser that operates on a single frequency. In other embodiments, the device may be a heterodyne type of device and the laser operates on at least two frequencies to produce two overlapping beams that are polarized and orthogonal. The light source 502 emits a light 518 that is directed into a beam splitting device 520. Here, a first portion 522 of the light is reflected and transmitted to the optical receiver 506. The first portion 522 is reflected off of at least one mirror 523 to direct the first portion to the optical receiver 506. In the exemplary embodiment, the first portion 522 is reflected off a plurality of mirrors 523 and the beam splitter 520. This first portion 522 is a reference beam of light that used for comparison with a returned or reflected light.

A second portion 524 of the light is transmitted through the beam splitting device 520 and is directed towards the retroreflector 516. It should be appreciated that the optical assembly 504 may further include other optical components, such as but not limited to lenses, quarter wave plates, filters and the like (not shown) for example. The second portion 524 of light travels to the retroreflector 516, which reflects the second portion 524 back towards the device 500 along a path 527 that is parallel to the outgoing light. The reflected light is received back through the optical assembly where it is transmitted through the beam splitting device 520 to the optical receiver 506. In the exemplary embodiment, as the returning light is transmitted through the beam splitting device 520, it joins a common optical path with the light of first portion 522 to the optical receiver 502. It should be appreciated that the optical assembly 504 may further include additional optical components (not shown), such as an optic that produces a rotating plane of polarization for example, between the beam splitting device 520 and the optical receiver 506. In these embodiments, the optical receiver 506 may be composed of multiple polarization sensitive receivers that allow for power normalization functionality.

The optical receiver 506 receives both the first portion 522 and the second portion 524 light. Since the two light portions 522, 524 each have a different optical path length, the second portion 524 will have a phase shift when compared to the first portion 522 at the optical receiver 506. In an embodiment where the device 500 is a homodyne interferometer, the optical receiver 506 generates an electrical signal based on the change in intensity of the two portions of light 522, 524. In an embodiment where the device 500 is a heterodyne interferometer, the receiver 506 may allow for phase or frequency measurement using a technique such as a Doppler shifted signal for example. In some embodiments, the optical receiver 506 may be a fiber optic pickup that transfers the received light to a phase interpolator 508 or spectrum analyzer for example. In still other embodiments, the optical receiver 506 generates an electrical signal and transmits the signal to a phase interpolator 508.

In an incremental interferometer, it is necessary to keep track of the change in the number of counts m (from the equation described hereinabove). For the case of which the beam of light is kept on a retroreflector 516, the optics and electronics within the optical receiver 506 may be used to keep track of counts. In another embodiment, another type of measurement is used, in which the light from the distance meter is sent directly onto the object to be measured. The object, which might be metallic, for example, may reflect light diffusely so that only a relatively small fraction of the light returns to an optical receiver. In this embodiment, the light returns directly on itself so that the returning light is substantially coincident with the outgoing light. As a result, it may be necessary to provide a means to reduce the amount of light feeding back into the light source 502, such as with a Faraday isolator for example.

One of the difficulties in measuring the distance to a diffuse target is that it is not possible to count fringes. In the case of a retroreflector target 516, it is known that the phase of the light changes continuously as the retroreflector is moved away from the tracker. However, if a beam of light is moved over an object, the phase of the returning light may change discontinuously, for example, when the light passes by an edge. In this instance, it may be desired to use a type of interferometer known as an absolute interferometer. An absolute interferometer simultaneously emits multiple wavelengths of light, the wavelengths configured to create a "synthetic wavelength," which might be on the order of a millimeter, for example. An absolute interferometer has the same accuracy as an incremental interferometer except that it is not necessary to count fringes for each half wavelength of movement. Measurements can be made anywhere within a region corresponding to one synthetic wavelength.

In an embodiment, the optical assembly 504 may include a steering mirror (not shown), such as a micro-electromechanical system (MEMS) mirror that allows light from an absolute interferometer to be reflected from the scanner and received back by the scanner to measure rapidly over an area.

In one embodiment the device may include an optional image acquisition device, such as a camera 529, which is used in combination with an absolute interferometer. The camera 529 includes a lens and a photosensitive array. The lens is configured to image the illuminated object point on a photosensitive array. The photosensitive array is configured to be responsive to the wavelengths of light emitted by the absolute interferometer. By noting the position of the imaged light on the photosensitive array, it is possible to determine the ambiguity range of the object point. For example, suppose that an absolute interferometer has an ambiguity range of 1 mm. Then as long as the distance to the target is known to within one millimeter, there is no problem in using the interferometer to find the distance to the target. However, suppose that the distance to the target is not known to within the ambiguity range of one millimeter. In one embodiment, a way to find the distance to the target to within the ambiguity range is to place the camera 529 near the point of emission of the beam of light. The camera forms an image of the scattered light on the photosensitive array. The position of the imaged spot of light depends on the distance to the optical target and thereby provides a way of determining the distance to the target to within the ambiguity range.

In an embodiment, the distance measurement device uses coherent light (e.g. a laser) in the determination of the distance to the object. In one embodiment, the device varies the wavelength of a laser as a function of time, for example, linearly as a function of time. Some of the outgoing laser beam is sent to an optical detector and another part of the outgoing laser beam that travels to the retroreflector is also sent to the detector. The optical beams are mixed optically in the detector and an electrical circuit evaluates the signal from the optical detector to determine the distance from the distance meter to the retroreflector target.

In one embodiment the device 500 is an absolute distance meter (ADM) device. An ADM device typically uses an incoherent light and determines a distance to an object based on the time required to travel from the distance meter to the target and back. Although ADM devices usually have lower accuracy than interferometers, an ADM provides an advantage in directly measuring distance to an object rather than measuring a change in distance to the object. Thus, unlike an interferometer, an ADM does not require a known initial position.

One type of ADM is a pulsed time-of-flight (TOF) ADM. With a pulsed TOF ADM, a laser emits a pulse of light. Part of the light is sent to an object, scatters off the object, and is picked up by an optical detector that converts the optical signal into an electrical signal. Another part of the light is sent directly to the detector (or a separate detector), where it is converted into an electrical signal. The time dt between the leading edge of the two electrical pulse signals is used to determine the distance to from the distance meter to the object point. The distance D is just $D=a+dt*c/(2n)$, where a is a constant, c is the speed of light in vacuum, and n is the index of refraction of light in air.

Another type of ADM is a phase-based ADM. A phased-based ADM is one in which a sinusoidal modulation is directly applied to a laser to modulate the optical power of the emitted laser beam. The modulation is applied as either a sinusoid or a rectangle. The phase associated with the fundamental frequency of the detected waveform is extracted. The fundamental frequency is the main or lowest frequency of the waveform. Typically, the phase associated with the fundamental frequency is obtained by sending the light to an optical detector to obtain an electrical signal, condition the light (which might include sending the light through amplifiers, mixer, and filters), converting the electrical signals into digitized samples using an analog-to-digital converter, and then calculating the phase using a computational method.

The phase-based ADM has a measured distance D equal to $D=a+(s+p)*c/(2*f*n)$, where "a" is a constant, "s" and "p" are integer and fractional parts of the "ambiguity range" of an object point, and "f" is the frequency of modulation, "c" is the speed of light in vacuum, and n is the index of refraction. The quantity $R=c/(2*f*n)$ is the ambiguity range. If, for example, the modulation frequency is f=3 GHz, then from the formula the ambiguity range is approximately 50 mm. The formula for "D" shows that calculated distance depends on the speed of light in air, "c/n". As in the case of the absolute interferometer, one of the parameters that it is desirable to determine is the ambiguity range for the object point under investigation. For an AACMM 100 used to measure the coordinates of a diffuse surface, the beam of light from the device 500 may in the course of a few milliseconds be directed to objects separated by several meters. If the ambiguity range was not determined, such a large change would likely exceed the ambiguity range of the device and hence would leave the ADM without knowledge of the distance to the object point.

In one embodiment the emitted light is modulated at a plurality of frequencies so that the ambiguity range may be determined in real time. For example, in one embodiment four different modulation frequencies may be simultaneously applied to laser light. By known means of sampling and extraction procedures, the absolute distance to the target can be determined by calculating the phase for each of these four frequencies. In other embodiments, fewer than four frequencies are used. Phase-based ADMs may be used at either near or far ranges. Modulation and processing methods are possible with other types of incoherent distance meters. Such distance meters are well known in the art and are not discussed further.

Figure 12:
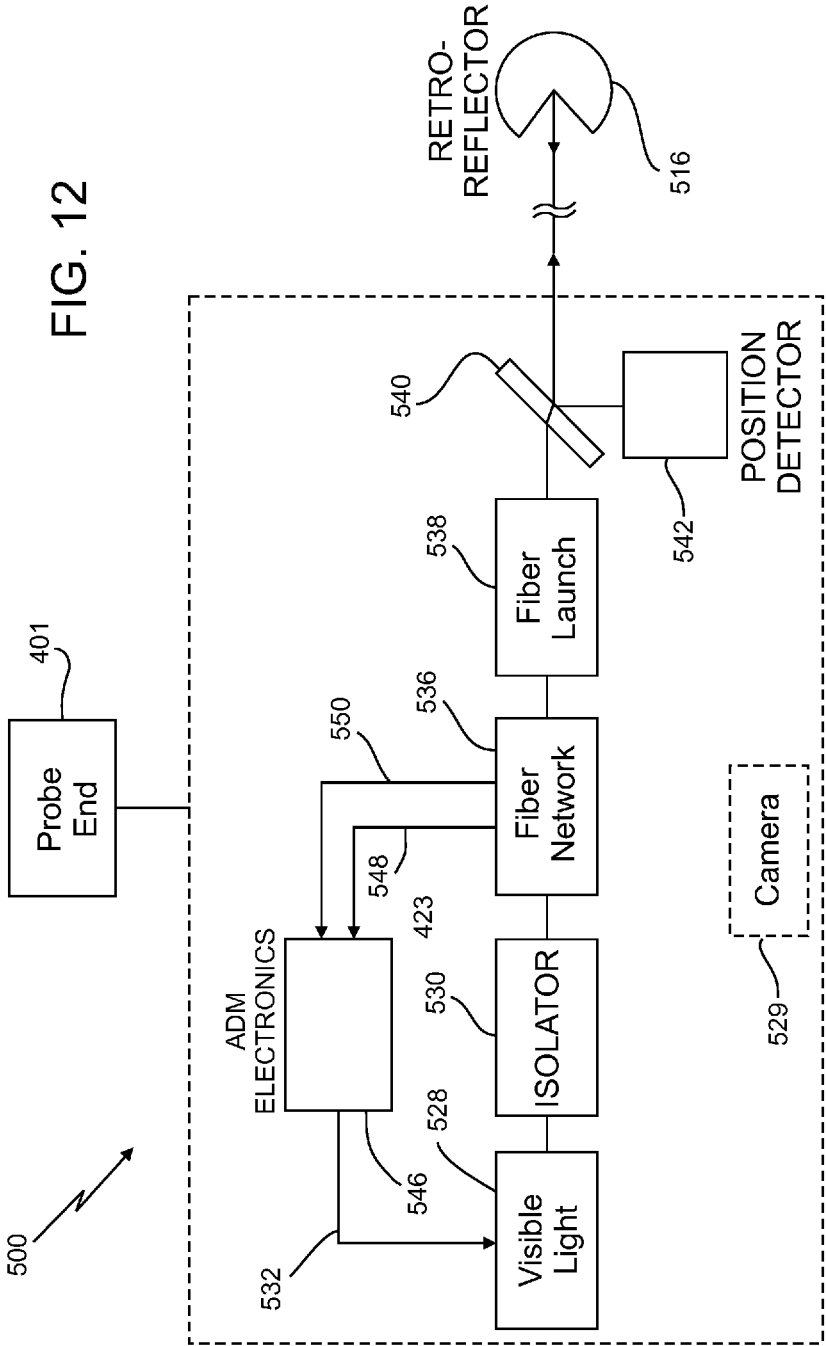
FIG. 12 is a schematic view of an embodiment wherein the device of FIG. 10 is an absolute distance meter system according to an embodiment.
Figure 13:
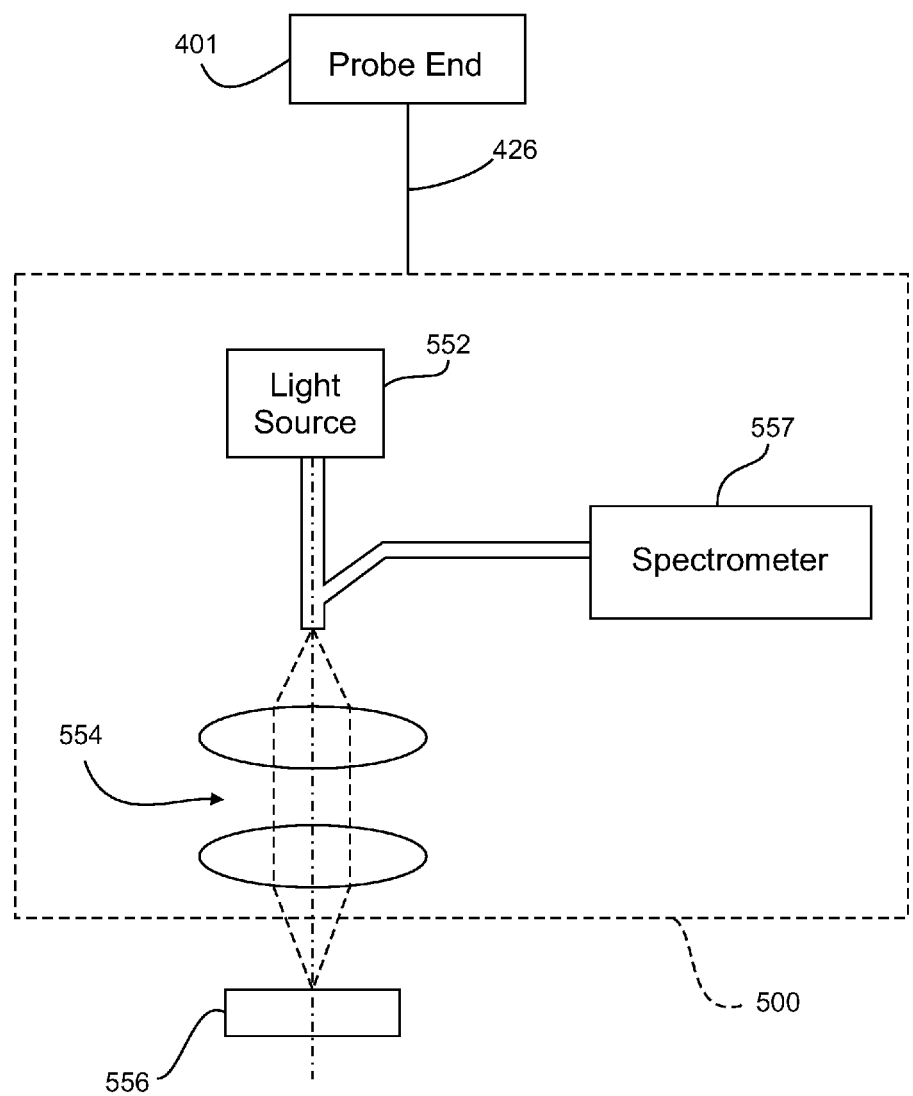
FIG. 13 is a schematic view of an embodiment wherein the device of FIG. 10 is a focusing type distance meter according to an embodiment.

In one embodiment shown in FIG. 12, the device 500 is an ADM device that includes a light source 528, an isolator 530, ADM electronics 546, a fiber network 536, a fiber launch 538, and optionally a beam splitter 540 and position detector 542. The light source 528 may be laser such as a red or infrared laser diode for example. Laser light may be sent through an isolator 530, which may be a Faraday isolator or an attenuator, for example. The isolator 530 may be fiber coupled at its input and output ports. ADM electronics 532 modulates the light source 528 by applying a radio frequency (RF) electrical signal to an input of the laser. In an embodiment, the RF signal is applied through the cable 532 which sinusoidally modulates the optical power of the light emitted by the laser at one or more modulation frequencies. The modulated light passing through the isolator travels to the fiber network 536. Some of the light travels over optical fiber 548 to the reference channel of the ADM electronics 546. Another portion of the light travels out of the device 500, reflects off target 516, and returns to the device 500. In one embodiment, the target 516 is a non-cooperative target such as a diffusely reflecting material such as aluminum or steel. In another embodiment, the target 516 is a cooperative target, such as a retroreflector target, for example, that returns most of the light back to the device 500. Light entering the device 500 passes back through the fiber launch 538 and fiber network 536 and enters the measure channel of the ADM electronics 546 through the fiber optic cable 550. The ADM electronics 546 includes optical detectors that convert the reference and measure optical signals received from the optical fiber 548 and 550 into electrical reference and measure signals. These signals are processed with electronics to determine a distance to the target.

In one embodiment, the light from the device 500 is sent to a retroreflector rather than a non-cooperative (diffusely scattering) target. In this case, a position detector 542 may be included to receive a small amount of light reflected off a beamsplitter 540. The signal received by the position detector 542 may be used by a control system to cause the light beam from the device 500 to track a moving retroreflector 516. If a scattering target is used rather than a retroreflective target, the beamsplitter 540 and the position detector 542 may be omitted.

In one embodiment, the ADM device 500 incorporates a configuration such as that described in commonly owned U.S. Pat. No. 7,701,559 which is incorporated herein by reference. It should be appreciated that both the interferometer devices and the ADM devices determine the distance to the object at least in part based on the speed of light in air.

Another type of distance meter is one based on a focusing method. Examples of focusing distance meters are a chromatic focusing meter, a contrast focusing meter, and an array sensing focusing meter. A device using a chromatic focusing method such as the one shown in FIG. 13, incoherent white light is generated by the light source 552. Due to a chromatic aberration of a lens 554 in the optical assembly the light is focused in a "focal line" on the object 556 based on the wavelength of light. As a result, different wavelengths components of the white light are focused at different distances. Using a spectrometer 557, the distance to the object 556 may be determined.

Figure 14:
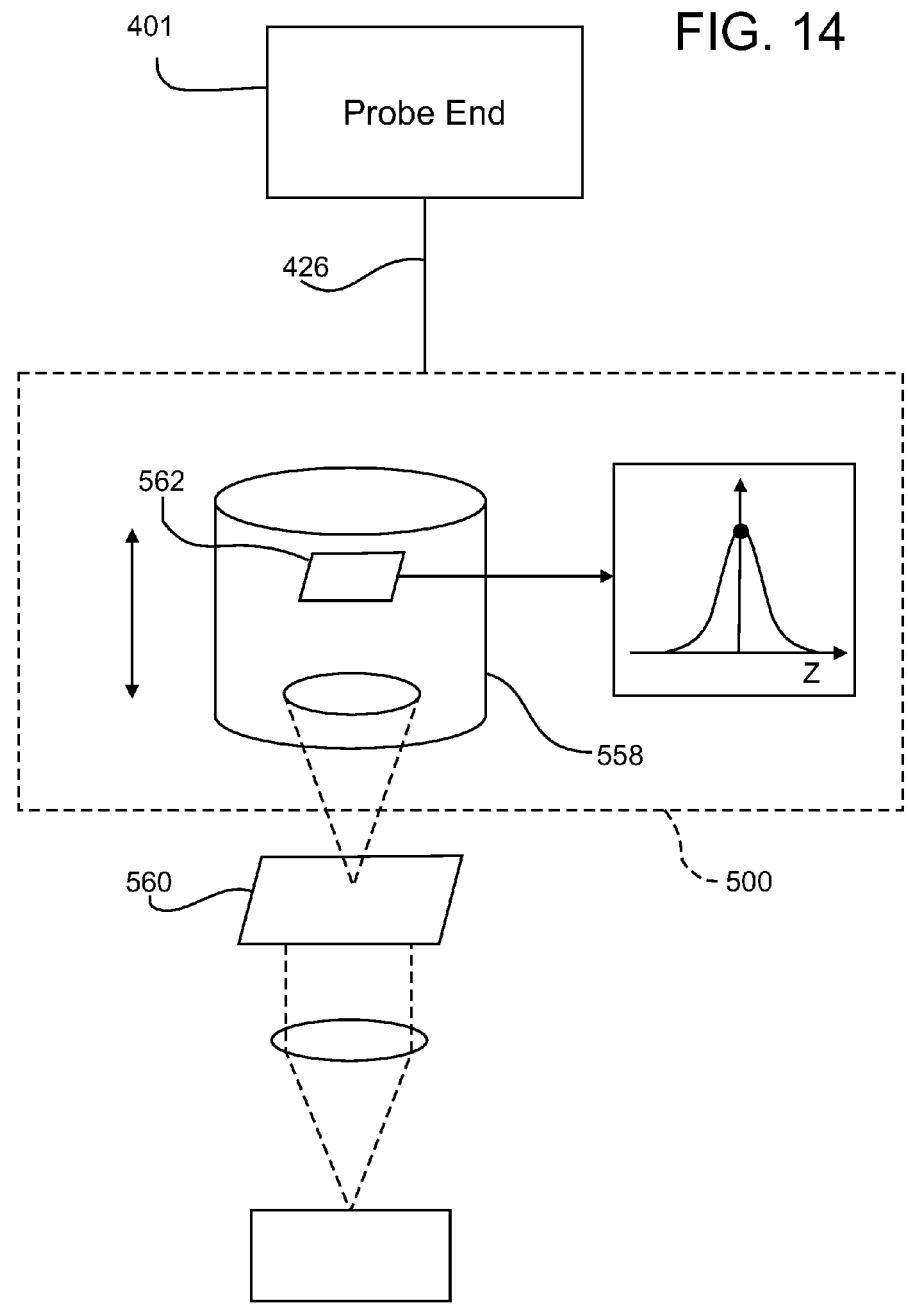
FIG. 14 is a schematic view of an embodiment wherein the device of FIG. 10 is a contrast focusing type of distance meter according to embodiment.

Another type of focusing distance meter shown in FIG. 14 is a contrast focusing device. In this embodiment, the distance to the object is determined by focusing to a maximum contrast or image sharpness. The focusing is achieved by moving a camera 558 along an axis in the direction of the object 560. When the position of greatest contrast has been found, the object 560 lies on the optical axis of the sensor 562 at a known distance. This known distance is predetermined during a calibration process.

In one embodiment, the device 500 may be an array sensing focusing meter. In this type of device, a source of light sends light through a lens and a beam splitter. Part of the light strikes the object, reflects off the beam splitter, and travels to a photosensitive array. If the object under inspection is at the focal position of the spot of light, the light on the photosensitive array will be very small. Hence the AACMM 100 could be used to capture the 3D coordinates whenever the spot on the array was sufficiently small.

In still another embodiment, the device 500 may be a conoscopic holography device. In this type of device, the surface of the object is probed by a laser point. The laser light is diffusely reflected by the surface to form a point light source. The light cone emanating from this point is widened by an optical system. A birefringent crystal is arranged between two circular polarizers to split the light into an ordinary beam and an extraordinary beam. After transmitting through the second polarizing lens, the two beams superimpose to generate a holographic fringe pattern that may be acquired by a photosensitive sensor, such as a CCD camera. The distance to the object is determined from the interference fringes by image processing.

It should be appreciated that while the focusing devices and the conoscopic holography devices may depend on the index of refraction of light in air, the determination of distance for these devices is independent of the speed of light in air.

The reach of an AACMM is often relatively short in comparison to the environment in which it is located. For example, an articulated arm may be used to measure large tooling structures for an aircraft, the tooling structures being located within a large hangar or manufacturing facility. In such situations, it is often necessary to move the AACMM from one location to another while measuring the same component. For example, for the large tooling structure described above, the AACMM may be moved from a left side of the tooling structure to a middle part of the structure and to provide the three-dimensional coordinates measured by the AACMM within a common frame of reference. In the past, various methods have been established for doing this, and although these methods have been generally suitable for their intended purpose, they have not satisfied the need for doing this while moving the AACMM over large distances.

In an embodiment, a distance meter is attached to the end of the AACMM. The AACMM has an origin having three translational degrees of freedom. The AACMM also has an orientation, which has three orientational degrees of freedom. The AACMM is located within an environment having its own frame of reference, referred to herein as a target frame of reference. For example, in the example given above, the large tooling structure may be described by a CAD model or by a model obtained from prior 3D measurements. In relation to the CAD model or measured model, the target frame of reference is assigned. The target frame of reference has a target origin, usually assigned Cartesian coordinates (0,0,0) within the target frame of reference. The target frame of reference will also have an orientation, which may be described in terms of three Cartesian axes x, y, and z.

The AACMM has an AACMM origin and an AACMM orientation in relation to the target frame of reference. In other words, the AACMM origin is offset from the target frame of reference by some amount dx, dy, dz, and the three axes of the AACMM frame of reference may be described by three rotation angles relative to the axes of the target frame of reference.

It is often desirable to know the AACMM frame of reference within the target frame of reference, for example, when trying to compare measured values to those indicated in a CAD model. By such means, the AACMM may determine whether a component or tool has been manufactured within specified tolerances. For the case in which the AACMM is moved from a first AACMM frame of reference to a second AACMM frame of reference, it is useful to know both the first and second AACMM frame of reference in the target frame of reference.

A distance meter attached to the end of the AACMM may be used to provide the mathematical transformations needed to move from one frame to another. To do this, the distance meter measures the distance to at least three targets having 3D coordinates known at least approximately within the target frame of reference. In some cases, the locations of the at least three targets are arbitrary and are not known even approximately. In some cases, a CAD model shows nominal 3D coordinates of features on an object. By measuring 3D coordinates of at least three features, the arm may construct x, y, and z (or equivalent) axes for a target coordinate system. For example, a first measured point may establish the origin. A second measured point may be used to establish the x axis in the target frame of reference. The third measured point may be used to establish the y and z axes. (The y axis is perpendicular to the x axis, and the z axis is perpendicular to both the x and y axes.) In other cases, a large number of points may be measured with the arm, and a best fit procedure used to determine a best fit to a CAD model. This best fit then provides a basis for the target frame of reference.

Regardless of the method used, by measuring with the AACMM the 3D coordinates of at least three points, the arm may determine the position and orientation of the AACMM frame of reference in the target frame of reference. In some cases, this may be done over a region extending beyond an individual tool or component and may extend to an entire building. For example, a building might have multiple targets measured by distance meters to establish a frame of reference for all objects within the building.

The operation of moving an articulated arm is moved to more than one position is referred to as relocation, and the method of establishing a common frame of reference following relocation is often referred to as registration.

In an embodiment, at least three targets are provided within the target frame of reference. These targets may be cooperative or non-cooperative targets. An example of a cooperative target is a retroreflector—for example, a cube corner retroreflector. An example of a non-cooperative target is a feature on an object—for example, a sphere or a hole. An example of a target that may be considered cooperative or non-cooperative is a highly reflective target, for example, a highly reflective circular target. Such targets are often referred to as retroreflective targets even though they do not reflect as much light as a cube corner retroreflector, for example. In some cases, non-cooperative targets are natural features of an object—for example, the point of intersection of three planar surfaces.

Although an AACMM is often used to measure relatively small parts with a tactile probe or scanner attached to the end of the arm, it is sometimes helpful to obtain 3D data may be obtained on a larger scale by measuring distances to relatively far-away objects. By combining this information with the information provided by the collection of angular encoders in the articulated arm CMM, it is possible to obtain 3D coordinates of relatively distant points.

In some cases, it is useful to combine a distance measured by a distance meter such as the ADM of FIG. 12 with an image obtained by a camera such as the camera 529 of FIG. 12 to obtain scaling information for the camera image or to provide dimensional information on an object shown in the camera image.

Figure 15:
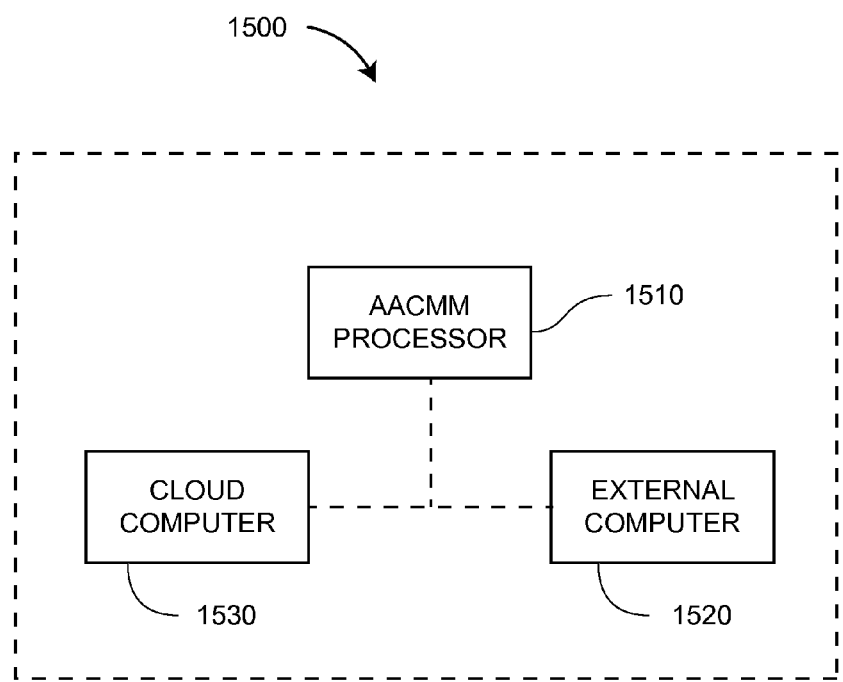
FIG. 15 is a block diagram of a processor system according to an embodiment.

In an embodiment, a processor system 1500 of FIG. 15 is used in conjunction with an articulated arm CMM that includes a distance ranging system 500 and a camera 529. The processor system includes at least one of the processor elements 1510, 1520, and 1530. The AACMM processor 1510 represents the collection of processors within the AACMM and may include, for example, the base processor 204, the encoder DSPs, the Coldfire processor, or any other computing device found in the AACMM or its accessories. The external computer may be used to run application software particularly relevant to the applications described below. The computer may be a cloud computer, by which is meant a remote networked computer. The connections among the processors 5150, 1520, and 1530 may be through wired connections, wireless connections, or a combination of wired and wireless connections.

In some cases, a single distance measurement to a point may provide enough information to determine one or more dimensions of an imaged object. For example, suppose that a cylindrical column or a cylindrical pipe is shown in an image on the camera 529 of FIG. 12. In an exemplary method, an operator sends a beam of light from the ADM 500 of FIG. 12 to a surface point of the column and measures the distance to that surface point with the ADM. The width of the column may then be found to reasonable accuracy by multiplying the subtended angle in radians times the measured distance. The width of the column may be found to slightly greater accuracy using the formula w=2d tan(θ/2), where w is the width of the column, d is the measured distance from the articulated arm to the measured surface point, and theta is the subtended angle of the column as seen by the camera. The subtended angle θ is the angular width of the column as determined from the camera image. For example, if the camera has a FOV of 40 degrees, the photosensitive array in the camera 529 has 2000 pixels across, and the column occupies 100 of the pixels, then the angular subtense of the column is approximately (40°)(100/2000)(π/180°)=0.035 radian. If the distance d to the column is measured by the ADM 500 to be 10 meters, then the width of the column is approximately 0.35 meter.

To obtain the desired accuracy, the distance d may be the distance from the perspective center of the camera 529 to the object point rather than the distance from the ADM 500 to the object point. (The perspective center of the camera 529 is the point within the camera through which paraxial rays of light from object points appear to pass in traveling through the lens to the photosensitive array.) Because the distance to the ADM 500 and the position and orientation of the camera 529 are known, it is possible to determine the distance from the camera perspective center to the object point.

In the case of the column, the cylindrical geometry or symmetry of the column enabled the width of the column to be determined. A sphere has a similar known geometry that is invariant with direction of view, and this geometrical feature enables its radius or diameter to be determined with a single measurement of a distance d combined with a single image from the camera 529. In a similar manner, other symmetries without a scene may be used to extract dimensional features by measuring a distance with the ADM 500 and an angular subtense with the camera 529 of one or more points, dimensional quantities may be determined. In addition, the angular measurements provided by the AACMM provide additional information that speed dimensional measurements or improve accuracy.

As another example of how symmetries of objects in camera images may be used to extract dimensional data, consider the case of an articulated arm sitting on a table with a wall straight ahead, walls to the left and right, a ceiling and floor also in the foreground. In an embodiment, the AACMM is positioned far enough away to see portions of all these surfaces. An operator may use the ADM 500 and the angle measurement of the AACMM to determine 3D coordinates on three points of the wall straight ahead. These three 3D coordinates determine provide enough information to determine an equation for a plane of the wall in the frame of reference of the AACMM. A user may then select any point on the image of the front wall and get in return 3D coordinates of that point. For example, once the equation of the plane of the wall is known, the 2D image of the mark by the camera 529 provides enough information to determine the 3D coordinates of the mark. As another example, a user might be interested in knowing whether a piece of equipment would fit between two points on the wall. This could also be determined using the method described hereinabove.

The equations of the planes that represent the left wall, right wall, floor and ceiling may likewise be determine based on three points, or the constraint that the walls, ceiling, and floor be mutually perpendicular may be used to reduce the number of points collected in subsequent measurements. For example, to determine the equation of the plane of the front wall, three or more points are needed. With this done, the equation of the plane of the right side wall may be determined by two points based on constraints of perpendicularity. With this done, the equation of the plane of the floor may be determined by one point based on constraints of perpendicularity with the front wall and right side wall. In this way, an AACMM may be used to quickly determine the dimensions of a room, the positions of doors, windows, and other features.

The 3D coordinates of points in an environment are based on the distance readings of the ADM 500 and the angle readings of the AACMM, but the symmetries (or geometries) of the surroundings are revealed by the camera image. Information on the observed symmetry may be provided either before or after 3D points are collected by the AACMM. For example, a user may measure three points on the wall straight ahead and then give a command "fit to a plane," which causes software to fit the three points to a plane. Alternatively, the user may first select the command "fit to a plane" and then measure the three 3D points. In some cases, automated methods, such as those executed in software for example, may be provided to facilitate rapid measurement of commonly viewed features or structures. For example, computer executed software may be used to lead a user to select points to locate walls, doors, windows, etc. In most cases, the user will need to state the type of symmetry or geometry in the association between the camera image and AACMM measurements. In the example given above, for example, by selecting the command "fit to a plane," the user was identifying the region being measured as a plane. Stated another way, the user was saying that the region being measured was characterized by a "planar geometry" or a "planar symmetry."

To supplement the structural representation based on 3D points obtained from the combination of ADM distance readings, AACMM angle readings, and camera-revealed geometries (symmetries), it is possible to determine the 3D structure based on visual cues provided in overlapping camera images. For example, suppose that a wall had a number of distinctive features—doors, windows, light fixtures, tables, etc. When those features are seen in two or more overlapping images, mathematical techniques may be used to extract "cardinal points" that match in each of the two or more overlapping images. An example of such a mathematical technique is SIFT (scale invariant feature transform) disclosed in U.S. Pat. No. 6,711,293. Other examples include edge detection, blob detection, and ridge detection. Furthermore for images collected sequentially as overlapping images as the AACMM is camera position and orientation is changed, methods such "optical flow," adapted from the studies of American psychologist James Gibson in the 1940s. A tutorial on optical flow estimation as used today is given in "Mathematical Models in Computer Vision: The Handbook" by N. Paragios, Y. Chen, and O. Faugeras (editors), Chapter 15, Springer 2005, pp. 239-258, the contents of which are incorporated by reference herein. It is generally true that 3D data provided by the articulated arm CMM is on its own sufficient to register multiple camera images, but pixel-by-pixel registration may be improved by using methods such as SIFT, optical flow, and edge detection. In addition, such methods may be used to extend the 3D coordinates of points beyond those directly measured with the ADM 500 and AACMM angle measurements.

A camera image (or multiple registered camera images) may be displayed and the user enabled to obtain dimensional information. For example, a user may point to a corner at which the left wall, front wall, and floor intersect and have displayed the 3D coordinates of that point. As a second step, the user may point to a second point at which the right wall, front wall, and floor intersect and have displayed the distance between the first point and the second point. As another example, a user may ask for the volume or floor area of the room and have it automatically calculated. Automated processes may be provided, such as computer executed software for example, to automatically look for and measure certain features. In the room example, the software may look for and automatically provide the dimensions of locations of every door and window in the room.

Dimensions, lines, or other information may be presented to the user along with a camera image, which may include a collection of registered images and may also include lines, annotation, or measured values superimposed on the registered images. The collection of registered images may be adjusted in perspective according to a position and direction of the AACMM. With the base of the AACMM fixed in place, for example, on a table, the probe end of the AACMM may be moved around and the perspective changed accordingly. For example, if the AACMM is rotated from facing the front wall to facing the back wall, the registered images may be correspondingly rotated to show the image of the side wall. This change in direction and perspective is easily and precisely done with an AACMM because the AACMM knows the six degrees-of-freedom (position and orientation) of the probe end (or camera or any other part of the AACMM) at all times.

In the present invention, the term 3D structural image is used to refer to a 3D image obtained based at least in part on ADM 500 distance measurements, AACMM angle measurements, and 2D visual images obtained from an AACMM camera, all combined with provided knowledge of geometry or symmetry of measured features. In an embodiment, the 3D structural image may be further based on a matching of cardinal points seen in overlapping 2D visual images.

In many cases, it can be useful to combine the capabilities for measuring with the ADM 500 with the ability to measure detailed characteristics of objects with a tactile probe or scanner attached to the AACMM. For example, a contractor may be hired to install within a kitchen cabinets and a countertop. In a first step, an operator may mount the AACMM on a platform in the kitchen and take a scan of the surrounding walls, cabinets, and appliances. The operator may use a scanner or tactile probe to measure the position of plumbing and other elements in relation to cabinets and walls. Based on these measurements, a contractor or design consultant may develop a rendered image showing the proposed location and appearance of additions or replacements in the kitchen, which may include new countertops. After the plans are approved, the contractor may remove old cabinets (if necessary) and replace them with new cabinets. The contractor may then measure the as-built cabinets and plumbing using the articulated arm probing accessories, which might include a tactile probe and a scanner, for example, a laser line probe or a structured light (area) scanner. A traditional way of determining the required dimensions for countertops is to construct a mock-up assembly having the desired shape. Such a mock-up assembly might be constructed for example of plywood or particle board. An articled arm provides a faster and more accurate way to make such measurements.

As another example of the use of AACMM probing accessories with the ADM 500 measurements, consider the case of measurement of a large object with the AACMM probing accessories. A tactile probe or scanner attached to the AACMM may measure detailed features of an object from each of several registration positions. The ADM 500 and the angle measuring capability of the AACMM may be used in combination to measure the 3D coordinates of each of several surfaces, features, or geometries. By performing this measurement at each of the multiple registration positions, the AACMM measurements made with the probing accessories may be put into a common frame of reference. In some cases, the visual images of the 2D camera images may be matched to further improve registration, as discussed above with regard to optical flow, cardinal points, and the like. By methods such as these, the AACMM probing accessories can measure a larger object than would otherwise be possible.

An ADM 500 may be used in combination with the angle measuring capabilities of the AACMM to provide visualization through augmented reality (AR). In an embodiment, an AACMM having a distance meter 500 is used to measure surfaces and features that define a volume of interest. Representations of objects for which CAD or rendered models are available or representations of objects for which 3D measurements have been made, for example using a tactile probe or scanner attached to the AACMM, may be superimposed over a representation of the background environment on a computer display. The superimposed representation is referred to herein as the "superimposed 3D representation," and the representation of the background environment is referred to as the "background 3D representation." The background 3D representation may a fixed representation obtained from a CAD or rendered model or from a 3D model constructed using the ADM 500 in combination with the angle measuring capability of the AACMM as discussed hereinabove. A user may view the AR image on a computer display from multiple positions and directions, thereby enabling all sides of the object to be seen. A mouse, thumb wheel, or other user control may be used to change the position and orientation of the user with respect to the superimposed 3D representation. In so doing, the background representation is automatically changed to provide the proper perspective. One application for this capability is checking whether new equipment (as measured or designed) will properly fit into a factory floor. Another application is to support attaching of the new equipment to walls or other equipment. A user may adjust the position of a superimposed 3D representation in relation to the background representation on a computer display and then indicate on the display where a connection should be made to a wall or other equipment. The position at which holes are to be drilled, brackets attached, or other construction tasks performed to properly attach the different elements may be indicated on an AR image on a computer display in multiple ways. In an embodiment an operator may provide a recognizable "mark" that the camera of the AACMM (or a separate camera) may recognize. In an embodiment, the recognizable mark is an LED marker carried by the user and readily recognized by image processing software applied to the camera 2D image. In another embodiment, the recognizable mark is provided by a spot of light directed from the light source in the distance meter 500 onto the desired connection point. In an embodiment, the user directs the AACMM to point the beam of light from the light source of the ADM 500 to the desired connection point. In an alternative embodiment, a beam steering device attached to the end of the AACMM, for example a steering mirror or MEMS steering device, directs the beam of light from the ADM 500 to the desired connection point. In the case that precise connection operations are necessary, the AACMM may be moved near to the location of the connection operations to provide greater measurement accuracy, for example, by using the tactile probe or scanner of the AACMM. In this case, a MEMS device may be used to project a detailed construction pattern on the object or objects involved.

In some cases, a user display, for example on a laptop computer, tablet, smartphone, or specialty device, may include positioning and orientation capability that enables a user to enable a camera image to provide the background 3D representation. Then while walking around a superimposed 3D representation, the position and orientation information may be used to position the superimposed 3D image on the real-time camera image. In an embodiment, such positioning and orientation capability may be provided by position/orientation sensors within the device. Such a sensor may include accelerometers (inclinometers), gyroscopes, magnetometers, and altimeters. The readings from all of the separate sensor devices may be fused together by software, which may include for example a Kalman filter. A three-axis accelerometer and a three-axis gyroscope are often combined in a device referred to as an inertial measurement unit (IMU). In many cases, the magnetometer and altimeter are also included in what is referred to as an IMU. The magnetometer is used to measure heading. The altimeter is usually a pressure sensor. Some smart devices also include GPS or other means of determining location (for example, from cellular signals). However, these signals are often not available indoors and so some indoor facilities have provided indoor GPS systems, which may be of a variety of types, such as a device with an external antenna that retransmits the GPS signals indoors for example. In an industrial setting, the location and orientation of a device (such as the display device described above) may be provided through the use of photogrammetry by mounting cameras around a factory and viewing reflectors (such as LEDs of photogrammetry dots or spheres) on the display device. Another way to refresh position information is by the use of near-field communication (NFC) tags, which may be located at defined positions within a facility. An enhanced position/orientation sensor may include not only the accelerometer, gyroscope, magnetometer, and altimeter described above, but also a position location system, which might be a GPS system, a local GPS system or a photogrammetry system. Such an enhanced position/orientation sensor may also provide for refreshing position information based on accessing of NFC tags in the environment.

If the position and orientation of a display device is known, a camera may be used to provide the background 3D representation as the user walks around a superimposed 3D representation that appears in the AR image on the display device. The AACMM with distance meter 500 and a tactile probe or scanner may be used to collect all the 3D information needed to represent the superimposed 3D representation and to place the superimposed representation within a building or other environment. For example, suppose that an articulated arm CMM were used to scan dinosaur bones to provide a detailed 3D representation of the assembled bones. If desired, the scanned 3D images may be rendered using colors from a camera 529 on the AACMM or a different camera. The scanned image may provide the superimposed 3D representation in an augmented reality (AR) image on a user display. The ADM 500 and angle measuring capability of the AACMM may be used in combination to position the AR object within a museum or similar structure. As an observer walks around the AR object, a display held by the user captures the background 3D image with a camera integrated into the display device while superimposing the 3D superimposed representation over the live camera image.

An AR display may also be provided as an on-line experience. In an embodiment, an AACMM having an ADM 500 and a tactile probe or scanner is used to scan an object such as the dinosaur bones described above. The ADM 500 and distance measuring capability of the AACMM are used in combination to locate the desired position and orientation of the AR image within the background environment. In an embodiment, a detailed 3D image is of the background structure is captured by a TOF scanner, which is a type of scanner that steers a laser beam to a variety of locations while measuring the angle of the beam with two angle encoders and measuring the distance with an absolute distance meter based on TOF. In this way, an observer may view a detailed 3D view not only of the dinosaur bones but also of the background structure, which may be a museum.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A three-dimensional (3D) measuring device comprising:
an articulated arm coordinate measurement machine (AACMM), the AACMM including a base and a manually positionable arm portion having opposed first and second ends, the arm portion including a plurality of connected arm segments, each arm segment including at least one position transducer for producing a position signal, the first end attached to the base, a camera coupled to the second end, a non-contact 3D measurement device coupled to the second end, the noncontact 3D measurement device having a light source, the non-contact 3D measurement device configured to determine a distance to an object point based at least in part on the speed of light in air, and an electronic circuit which receives the position signal from the at least one position transducer and provides data corresponding to a position of the camera and the non-contact 3D measurement device; and a processor system including at least one of an AACMM processor, an external computer, and a cloud computer configured for remote access, wherein the processor system is responsive to executable instructions which when executed by the processor system is operable to:

causing the light source to send a first beam of light to a first object point;

causing the noncontact 3D measurement device to receive a first reflected light and determine a first distance to the first object point in response, the first reflected light being a portion of the first beam of light reflected by the first object point;

determining an angle of the first beam of light relative to the AACMM based at least in part on first position signals from the at least one position transducer;

determining first 3D coordinates of the first object point based at least in part on the first distance and a first angle of the first beam of light relative to the AACMM;

causing the camera to obtain a first 2D image of a first surface, the first 2D image having a first spot of light caused by the first beam of light intersecting the first surface at the first object point; and associating the first 3D coordinates to the first spot of light.

2. The 3D measuring device of claim 1 wherein the executable instructions further comprise determining a first dimension of a first feature in the first 2D image based at least in part on a first angular subtense of the first feature, the first distance, and a geometry of the first feature, wherein the first angular subtense is given with respect to a perspective center of the camera.

3. The 3D measuring device of claim 2 wherein the geometry of the first feature is one of a cylinder and a sphere, the first dimension being associated with a diameter of the cylinder and the sphere, respectively.

4. The 3D measuring device of claim 1 wherein the executable instructions further comprise:

causing the light source to send a second beam of light to a second object point;

causing the noncontact 3D measurement device to receive a second reflected light and determine a second distance to the second object point in response, the second reflected light being a portion of the second beam of light reflected by the second object point;

determining an angle of the second beam of light relative to the AACMM;

determining second 3D coordinates of the second object point based at least in part on the second distance and the second angle of the second beam of light relative to the AACMM; and causing the camera to obtain a second 2D image of the first surface, the second 2D image having a second spot of light caused by the second beam of light intersecting the first surface at the second object point.

5. The 3D measuring device of claim 4 wherein the executable instructions further comprise:

causing the light source to send a third beam of light to a third object point;

causing the noncontact 3D measurement device to receive a third reflected light and determine a third distance to the third object point in response, the third reflected light being a portion of the third beam of light reflected by the third object point;

determining an angle of the third beam of light relative to the AACMM;

determining third 3D coordinates of the third object point based at least in part on the third distance and the third angle of the third beam of light relative to the AACMM; and causing the camera to obtain a third 2D image of the first surface, the third 2D image having a third spot of light caused by the third beam of light intersecting the first surface at the third object point.

6. The 3D measuring device of claim 5 wherein the executable instructions further comprise determining when the first surface is a first plane shared by the first object point, the second object point, and the third object point, an equation for the first plane is based at least in part on the first 3D coordinates, the second 3D coordinates, and the third 3D coordinates.

7. The 3D measuring device of claim 6 wherein the executable instructions further comprise observing with the camera a mark on the first plane in a fourth 2D image, the mark not coinciding with a point of illumination by a distance meter, and determining fourth 3D coordinates of the mark based at least in part on the fourth 2D image.

8. The 3D measuring device of claim 6 wherein the executable instructions further comprise causing the camera to capture, in a fourth 2D image, a hole in the first plane and determining a diameter of the hole based at least in part on the fourth 2D image and on the equation of the first plane.

9. The 3D measuring device of claim 6 wherein the executable instructions further comprise:

causing the light source to send a fourth beam of light to a fourth object point on a second surface, the second surface being a planar surface perpendicular to the first plane;

causing the noncontact 3D measurement device to receive a fourth reflected light and determine a fourth distance to the fourth object point in response, the fourth reflected light being a portion of the fourth beam of light reflected by the fourth object point;

determining an angle of the fourth beam of light relative to the AACMM;

determining fourth 3D coordinates of the fourth object point based at least in part on the fourth distance and the fourth angle of the fourth beam of light relative to the AACMM;

causing the camera to obtain a fourth 2D image of the second surface, the fourth 2D image having a fourth spot of light caused by the fourth beam of light intersecting the second surface at the fourth object point;

causing the light source to send a fifth beam of light to a fifth object point on the second surface;

causing the noncontact 3D measurement device to receive a fifth reflected light and determine a fifth distance to the fifth object point in response, the fifth reflected light being a portion of the fifth beam of light reflected by the fifth object point;

determining an angle of the fifth beam of light relative to the AACMM;

determining fifth 3D coordinates of the fifth object point based at least in part on the fifth distance and the fifth angle of the fifth beam of light relative to the AACMM;

causing the camera to obtain a fifth 2D image of the second surface, the fifth 2D image having a fifth spot of light caused by the fifth beam of light intersecting the second surface at the fifth object point; and determining when the first surface is a second plane shared by the fourth object point and the fifth object point, an equation for the second plane based at least in part on the fourth 3D coordinates, the fifth 3D coordinates, and the equation for the first plane.

10. The 3D measuring device of claim 9 wherein the executable instructions further comprise:

causing the light source to send a sixth beam of light to a sixth object point on a third surface, the third surface being a planar surface perpendicular to the first plane and the second plane;

causing the noncontact 3D measurement device to receive a sixth reflected light and determine a sixth distance to the sixth object point in response, the sixth reflected light being a portion of the sixth beam of light reflected by the sixth object point;

determining an angle of the sixth beam of light relative to the AACMM;

determining sixth 3D coordinates of the sixth object point based at least in part on the sixth distance and the sixth angle of the sixth beam of light relative to the AACMM;

causing the camera to obtain a sixth 2D image of the third surface, the sixth 2D image having a sixth spot of light caused by the sixth beam of light intersecting the third surface at the sixth object point; and determining when the third surface is a third plane that includes the sixth object point, an equation for the third plane based at least in part on the sixth 3D coordinates, the equation of the first plane, and the equation of the second plane.

11. The 3D measuring device of claim 6 wherein the executable instructions further comprise determining a second dimension associated with a second feature of the first surface based at least in part on the equation of the first plane and on one of the first 2D image, the second 2D image, and the third 2D image.

12. The 3D measuring device of claim 11 wherein the executable instructions further comprise identifying the second feature based at least in part on the second dimension.

13. The 3D measuring device of claim 1 wherein the AACMM further includes at least one probe, the at least one probe selected from a group consisting of a tactile probe and a scanner.

14. The 3D measuring device of claim 13 wherein the executable instructions further comprise measuring a plurality of points on an inspection object with the at least one probe.

15. The 3D device of claim 14 wherein the executable instructions further include positioning the inspection object within an environment based at least in part on the plurality of measured points and on the first 3D coordinates of the first object point.

16. The 3D device of claim 1 wherein the executable instructions further include determining a superimposed 3D image based at least in part on 3D coordinates obtained from at least one of: a tactile probe attached to the AACMM, a scanner attached to the AACMM, a computer-aided design (CAD) model, and a rendered 3D image.

17. The 3D device of claim 16 wherein the executable instructions further include determining a background 3D image based at least in part on a combination of 2D camera images of a background environment and corresponding 3D coordinates of points in the background environment, the corresponding 3D coordinates of points in the background environment determined based at least in part on readings of the 3D non-contact measurement device and readings of the at least one position transducer.

18. The 3D device of claim 17 wherein the 3D device further includes a user display device separate from the AACMM.

19. The 3D device of claim 18 wherein the executable instructions further include superimposing on the user display the superimposed 3D image over the background 3D image.

20. The 3D device of claim 19 wherein the 3D device further includes a user control and the executable instructions further include adjusting on the user display the superimposed 3D image relative to the background 3D image based at least in part on a signal from the user control.

21. The device of claim 16 wherein the 3D device further includes a user display that has a second camera, the second camera being provided with a position/orientation sensor that provides information about the position and orientation of the second camera, the second camera being configured to provide a second camera image.

22. The device of claim 21 wherein the position/orientation sensor includes a sensor selected from a group consisting of: an accelerometer or inclinometer, a gyroscope, a magnetometer, an altimeter, a global positioning system (GPS), a local GPS system, and photogrammetry targets configured to work with one or more photogrammetry cameras.

23. The device of claim 21 wherein the executable instructions further include displaying on the user display a background representation based at least in part on the second camera, the executable instructions further including superimposing the superimposed 3D representation onto the background representation, the superimposed 3D representation based at least in part on the position and the orientation of the second camera.

24. The device of claim 21 wherein the executable instructions further including providing a background display based at least in part on 2D images from the second camera, wherein the 2D images are updated in response to changes in position and orientation of the second camera.

* * * * *